United States Patent [19]
Hirano

[11] Patent Number: 5,323,459
[45] Date of Patent: Jun. 21, 1994

[54] MULTI-CHANNEL ECHO CANCELER

[75] Inventor: Akihiro Hirano, Tokyo, Japan

[73] Assignee: NEC Corporation, Japan

[21] Appl. No.: 120,279

[22] Filed: Sep. 13, 1993

[30] Foreign Application Priority Data

Nov. 10, 1992 [JP] Japan .................. 4-299451

[51] Int. Cl.⁵ ............................................. H04M 9/08
[52] U.S. Cl. .................... 379/391; 379/388;
379/389; 379/390; 379/206; 379/201; 381/66;
381/94
[58] Field of Search ............... 379/391, 388, 389, 390,
379/206, 201; 381/66, 94

[56] References Cited
U.S. PATENT DOCUMENTS

| | | | |
|---|---|---|---|
| 4,712,231 | 12/1987 | Julstrom | 379/389 |
| 4,715,063 | 12/1987 | Haddad et al. | 379/390 |
| 5,131,032 | 7/1992 | Esaki et al. | 379/390 |

Primary Examiner—James L. Dwyer
Assistant Examiner—Jacques M. Saint-Surin
Attorney, Agent, or Firm—Ostrolenk, Faber, Gerb & Soffen

[57] ABSTRACT

A multi-channel echo canceler for canceling echo generated as a result of propagation of 2-channel received signals, along a spatial acoustical path via a first and a second loudspeaker, from a transmitted signal containing a speech source signal received through a first and a second microphone and the echo. The echo canceler is capable of highly accurate delay time difference estimation and also of quick detection of the movement or change of the talker. Right after the movement or change of the talker, the filter coefficient set updating is stopped, or step size is updated. Deterioration of the echo cancellation performance does not occur that might otherwise result from delay of the detection of the movement or change of the talker or reduction of estimated delay time difference.

12 Claims, 14 Drawing Sheets

F I G. 2
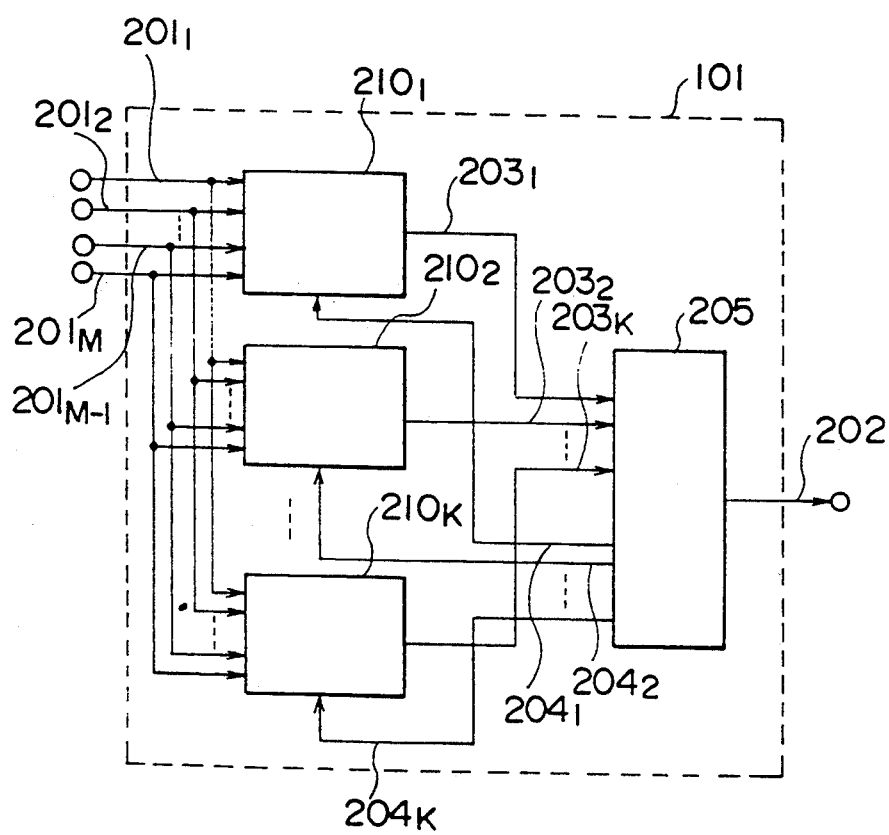

MULTI-CHANNEL ECHO CANCELER

BACKGROUND OF THE INVENTION

1. Field of the Invention

The present invention relates to echo cancelers and, more particularly, to a multi-channel echo canceler for canceling multi-channel echo, which is generated as a result of the propagation of a plurality of received signals through a spatial acoustic path, from a transmitted signal.

2. Detailed Description of the Invention

In conversation systems involving a plurality of received signals and a single transmitted signal or a plurality of transmitted signals, regarding the method or apparatus for multi-channel echo canceling, i.e., canceling of echo which is generated as a result of the propagation of a received signal through a spatial acoustic path, a cascade connection type and a linear combination type are proposed in the Technical Report of Institute of Electronics, Information and Communication Engineers of Japan, Vol. 84, No. 330, pp. 7-4, CS-84-178 (hereinafter referred to as Literature No. 1), and also a multi-channel echo canceler, with a single adaptive filter per channel, is proposed in Proceedings of the 1991 Institute of Electronics, Information and Communication Engineers, Spring Conference, Vol. 1, pp. 202, A-202 (hereinafter referred to as Literature No. 2). However, In the Proceedings of the 6-th Digital Signal Processing Symposium, pp. 144-149, A5-3 (hereinafter referred to as Literature No. 3), it is pointed out that the cascade connection type and linear combination type lead to large hardware size because the hardware size is proportional to the square of the number of channels, that the convergence of the adaptive filter is retarded when there is strong cross-correlation among received signals, and that the adaptive filter coefficients may fail to converge to the optimum value. Further, in Proceedings of the 1992 Institute of Electronics, Information and Communication Engineers, Spring Conference, Vol. 1, pp. 158, A-158 (hereinafter referred to as Literature No. 4), it is pointed out that in a multi-channel echo canceler with a single adaptive filter per channel, it takes a long time from the instant of movement or change of the talker till the re-convergence of the filter coefficients to the optimum value and that during this time the echo cancellation performance is deteriorated. To solve this problem, in the Literature No. 4 a compact multi-channel echo canceler is proposed, which can fast track the movement or change of the talker. The compact multi-channel echo canceler proposed in the Literature No. 4 will now be described in connection with its application to a television conference system, in which both the received and transmitted signals are of two channels.

FIG. 16 is a block diagram showing an audio part of a conventional 2-channel television conference system connecting two television conference rooms 30 and 31. Here, acoustic echo cancellation in the first television conference room 30 will be considered.

It is assumed that a second and a third talker 18 and 19 are present in the second television conference room 31.

Speeches 20 and 22 from the respective second and third talkers 18 and 19 are led through the spatial acoustic path so as to be inputted in a third microphone 24 and supplied to a second echo canceler $130_2$. The speeches inputted in the third microphone 24 are transmitted as a first received signal 1 to the first television conference room 30. Likewise, speeches 21 and 23 generated from the respective second and third talkers 18 and 19 are led through the spatial acoustic path so as to be inputted in a fourth microphone 25 and supplied to the second echo canceler unit $130_2$. The speeches inputted in the fourth microphone 25 are transmitted as a second received signal 2 to the first television conference room 30.

In the first television conference room 30, a first echo 5, which is generated as the first received signal 1 is reproduced by a first loudspeaker 3 and led through the spatial acoustic path to a first microphone 9, a second echo 6, which is generated as the second received signal 2 is reproduced by a second loudspeaker 4 and led through the spatial acoustic path to the first microphone 9, and a first transmitted signal 12, which is the speech of a first talker 11 reaching the first microphone 9, are added together to form a first mixed signal 14. Likewise, a third echo 7, which is generated as the first received signal 1 is reproduced by the first loudspeaker 3 and led through the spatial acoustic path to a second microphone 10, a fourth echo 8, which is generated as the second received signal 2 is reproduced by the second loudspeaker 4 and led through the spatial acoustic path to the second microphone 10, and a second transmitted signal 13, which is the speech of the first talker 11 reaching the second microphone 10, are added together to form a second mixed signal 15. For the canceling of the echoes 5 to 8 contained in the first and second mixed signals 14 and 15, a first echo canceler unit $130_1$ is used.

A delay time difference estimation circuit 101 receives the first and second received signals 1 and 2 as input signals and estimates the delay time difference between the two received signals, the result of estimation being supplied to a received signal selection circuit 102 and a filter coefficient set selection circuit 104. The received signal selection circuit 102 detects the received signal having a shorter delay time from the two received signals 1 and 2 according to the result of estimation in the delay time difference estimation circuit 101, the result of detection being supplied to a selector 103. The selector 103 receives the first and second received signals 1 and 2 as input signals and selectively supplies the received signal having the shorter delay time from the two received signals 1 and 2 to a first and a second adaptive filter 122 and 123 according to the result of detection in the received signal selection circuit 102. The filter coefficient set selection circuit 104 selects a set of filter coefficients among a plurality of preliminarily prepared sets of filter coefficients used in the first and second adaptive filters 122 and 123, the result of selection being supplied to the first and second adaptive filters 122 and 123 according to the result of estimation in the delay time difference estimation circuit 101.

The first adaptive filter 122 receives the received signal selected by the selector 103 as an input signal and generates an echo replica corresponding to the echo contained in the first mixed signal 14 by using the filter coefficient selected by the filter coefficient selection circuit 104, the generated echo replica being supplied to a first subtracter 107. The first subtracter 107 subtracts the echo replica as the output of the first adaptive filter 122 from the first mixed signal 14 to produce a first output signal 16. The first adaptive filter 122 is controlled such as to minimize the first output signal 16.

The second adaptive filter 123 receives the received signal selected by the selector 103 as an input signal and generates an echo replica corresponding to the echo contained in the second mixed signal 15 by using the filter coefficient selected by the filter coefficient selection circuit 104, the generated echo replica being supplied to a second subtracter 108. The second subtracter 108 subtracts the echo replica as the output of the second adaptive filter 123 from the second mixed signal 15 to produce a second output signal 17. The second adaptive filter 123 is controlled such as to minimize the second output signal 17.

The delay time difference estimation circuit 101 estimates the delay time difference between the first and second received signals 1 and 2 by using a cross-correlation function between the first and second received signals 1 and 2. Denoting the first and second signals 1 and 2 at instant n by $x_1(n)$ and $x_2(n)$, respectively, the cross-correlation function $R_{12}(n, m)$ at the instant n corresponding to the delay time difference m is defined as:

$$R_{12}(n, m) = E[x_1(n)x_2(n+m)] \tag{1}$$

$E[\cdot]$ is the ensemble average of ·. It is difficult, however, to calculate the ensemble average as defined. Usually, therefore, it is approximated by a time average. For example, using the first order recursive integral it is calculated as:

$$R_{12}(n, m) = (1-\alpha)x_1(n)x_2(n+m) + \alpha R_{12}(n-1, m) \tag{2}$$

where $\alpha$ is a constant given as $$0 < \alpha < 1 \tag{3}$$

By increasing $\alpha$, the integration period is increased to increase the accuracy of the delay time difference estimation. However, the tracking speed to the movement or change of the talker is reduced. By reducing $\alpha$, on the other hand, the integration period is reduced to increase the tracking speed to the movement or change of the talker. In this case, the accuracy of the delay time difference estimation is reduced.

In other words, increasing $\alpha$ for increasing the accuracy of the delay time difference estimation results in delay of detection of the movement or change of the talker. During the period from the movement or change of the talker till the actual detection of such movement or change, an erroneous set of filter coefficients is selected, thus increasing the residual echo so as to increase the amount of filter coefficient update. Such erroneous filter coefficient updating results in the production of a filter coefficient set having a great coefficient error. If such a filter coefficient set with great coefficient error is selected again, after it is recognized that the talker has moved or changed, the performance of echo cancellation is deteriorated.

On the other hand, reducing $\alpha$ for increasing the tracking speed to the movement or change of the talker results in reduction of the accuracy of the delay time difference estimation. In this case, the estimated delay time difference is changed frequently so as to bring about frequent filter coefficient switching, thus deteriorating the performance of echo cancellation.

As shown, the prior art method and apparatus for multi-channel echo cancellation as described above, pose problems such that increasing the accuracy of the delay time difference estimation results in a delay in the detection of the movement or change of the talker so as to increase the filter coefficient error in the adaptive filters, while increasing the tracking speed to the movement or change of the talker results in reduction of the accuracy of the delay time difference estimation so as to bring about frequent filter coefficient switching, thus deteriorating the performance of echo cancellation.

SUMMARY OF THE INVENTION

An object of the invention is to provide a multi-channel echo canceler, which is free from echo cancellation performance deterioration due to delay in the detection of the movement or change of the talker a reduction of the accuracy of delay time difference estimation.

To attain the above object of the invention, there is provided a multi-channel echo canceler for canceling echoes, which are generated as a result of propagation of 2-channel received signals along a spatial acoustic path from a first and a second loudspeaker to a first and second microphone, from mixed signals containing a speech source signal and the echoes inputted through the first and the second microphone. The multi-channel echo canceler comprises a delay time difference estimation circuit for receiving a first and a second received signal as inputs and for estimating the delay time difference between the 2-channel received signals, a received signal selection circuit for outputting a designation signal designating the shorter-delay-time one of the first and second received signals, a first selector for selecting the shorter-delay-time one of the first and second received signals according to the designation signal, a filter coefficient set selection circuit for selecting a set of filter coefficients among a plurality of preliminarily prepared sets of filter coefficients on the basis of a predetermined first algorithm according to the result of estimation in the delay time difference estimation circuit, a cross-correlation function value estimation circuit for estimating a plurality of cross-correlation function values between the two received signals by using a predetermined method, a second selector for selecting, among the estimated cross-correlation function values, the cross-correlation function value corresponding to the delay time difference between the two received signals, an absolute value calculation circuit for calculating the absolute value of the selected cross-correlation function value, a power level estimation circuit for estimating the average power level of the two received signals, a normalization circuit for normalizing the absolute value of the selected cross-correlation function value with the estimated average power level of the received signals, a coefficient updating control circuit for outputting updating information about the updating of the selected set of filter coefficients according to the result of the normalization, a first adaptive filter for receiving the shorter-delay-time received signal selected by the first selector as an input, generating a first echo replica corresponding to echo contained in the first mixed signal and minimizing the difference between a first mixed signal and a first echo replica according to the updating information, a first subtracter for outputting the result of subtraction of the first echo replica from the first mixed signal as the first output signal, a second adaptive filter for receiving the shorter-delay-time received signal selected by the first selector as an input, generating a second echo replica corresponding to echo contained in the second mixed signal and minimizing the difference between a second mixed signal and a second echo replica according to the updating information, and a second subtracter for outputting the result of subtraction of the second echo replica from the second mixed signal as the second output signal.

According to the invention, with the above construction it is possible to obtain highly accurate delay time difference estimation and also the quick detection of the movement or change of the talker. Right after the movement or change of the talker, the filter coefficient set updating is stopped, or step size is updated. Deterioration of the echo cancellation performance does not occur that might otherwise result from delay of the detection of the movement or change of the talker or reduction of accuracy of estimated delay time difference.

The above and other objects, features and advantages of the invention will become more apparent from the following description when the same is read with reference to the accompanying drawings.

BRIEF DESCRIPTION OF THE DRAWINGS

FIG. 1 is a block diagram showing a first embodiment of the multi-channel echo canceler according to the invention, in which 2-channel received and transmitted signals are dealt with;

FIG. 2 is a block diagram showing a delay time difference estimation circuit in a case in which the received signal in the first embodiment is a M-channel signal;

FIG. 15 is a block diagram showing an embodiment of the multi-channel echo canceler according to the invention, in which M-channel received and transmitted signals are dealt with.

DETAILED DESCRIPTION OF THE PREFERRED EMBODIMENTS

Preferred embodiments of the invention will now be described with reference to the accompanying drawings.

FIGS. 1 to 7 illustrate a first embodiment of the invention applied to cancellation of acoustic echo generated when a received signal is propagated from loudspeakers through spatial acoustic paths and recorded in microphones.

Figure 1:
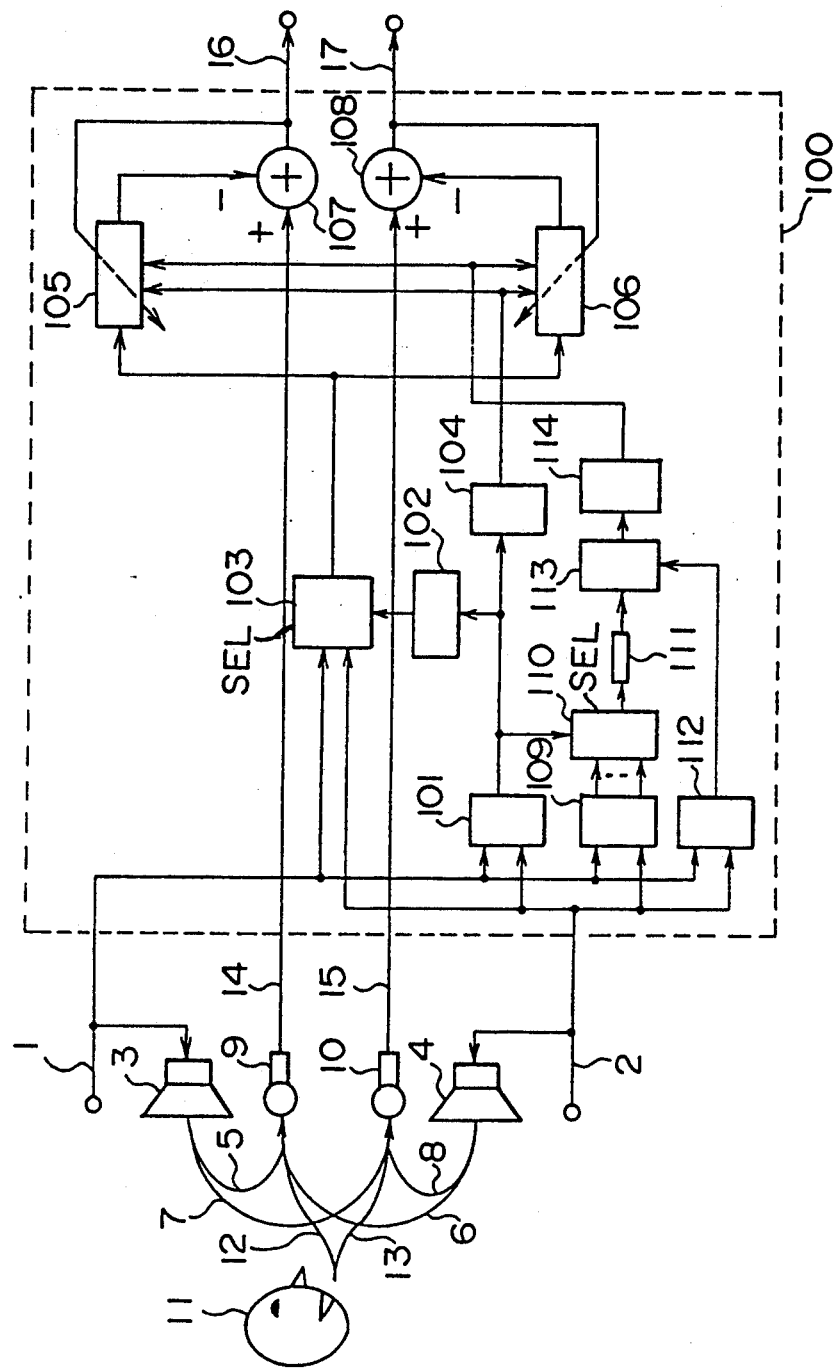

FIG. 1 is a block diagram showing a first embodiment of the multi-channel echo canceler according to the invention, in which received and transmitted signals are 2-channel signals. A delay time difference estimation circuit 101 receives a first and a second received signal 1 and 2 as input signals and estimates the delay time difference between the two received signals 1 and 2, the result of the estimation being supplied to a received signal selection circuit 102, a filter coefficient set selection circuit 104 and a second selector 110. The received signal selection circuit 102 detects the shortest-delay-time received signal according to the result of estimation in the delay time difference estimation circuit 101 and supplies the result of the detection to a first selector 103. In the case where the received signals are 2-channel signals, it is possible to determine the shorter-delay-time one of the two signals according to the sign of the delay time difference. Where the received signals are 3- or more channel signals, the shortest-delay-time received signal is selected by using a set of a plurality of delay time differences between two signals. In this case, an operation of selecting two signals among the plurality of received signals, determining the longer-delay-time one of the two signals according to the sign of the delay time difference between the two signals, and removing the received signal determined to be delayed longer from the subject of judgment, may be repeatedly executed until the shortest-delay-time received signal remains. The first selector 103 selectively supplies the shortest-delay-time one of the received signals 1 and 2 to a first and a second adaptive filter 105 and 106 according to the result of detection in the received signal selection circuit 102.

The filter coefficient set selection circuit 104 selects a set of filter coefficients among a plurality of sets of filter coefficients used by the first and second adaptive filters 105 and 106 according to the result of estimation in the delay time difference estimation circuit 101 and supplies the result of the selection to the first and second adaptive filters 105 and 106. Where the received signals are 2-channel signals, the following method is used for the filter coefficient set selection. In the discrete time process, it can be assumed that the delay time difference t between two signals takes one of $2t_{max}+1$ integral values $-t_{max}, \ldots, 0, \ldots, t_{max}$ without loss of generality. Thus, $2t_{max}+1$ sets of filter coefficients are prepared, and the $(t+t_{max}+1)$-th set of filter coefficients may be used. In the case, in which the received signal is of M-channels (M>2), the following method may be used for the filter coefficient set selection. The delay time of each received signal behind the shortest-delay-time received signal according to the result of estimation in the delay time difference estimation circuit 101. Denoting the delay times $t_1, t_2, \ldots, t_M$, it can be assumed that these delay times may take either of the integral values 0, 1, ..., $t_{max}$. Since there are $(t_{max}+1)^M$ series of selecting M integral values among the integral values 0, 1, ..., $t_{max}$ by permitting repetition $(t_{max}+1)^M$ sets of filter coefficients may be prepared, and a set of filter coefficients given as:

$$\sum_{i=1}^{M} (t_{max} + 1)^{i-1} t_i + 1$$

may be used.

A cross-correlation function value estimation circuit 109 estimates cross-correlation function values of the two received signals 1 and 2 and supplies the result of the estimation to the second selector 110. The second selector 110 selectively supplies a value corresponding to the delay time difference between the two received signals 1 and 2 estimated by the delay time difference estimation circuit 101, which is among the cross-correlation function values estimated by the cross-correlation function value estimation circuit 109, to an absolute value calculation circuit 111. The absolute value calculation circuit 111 calculates the absolute value of the cross-correlation function value selected by the second selector 110 and supplies the resultant absolute value to a normalizing circuit 113. A power level estimation circuit 112 estimates the average power level of the two received signals 1 and 2 and supplies the result of the estimation to the normalizing circuit 113. The normalizing circuit 113 normalizes the absolute value obtained in the absolute value calculation circuit 111 with the average power level of the received signals as estimated by the power level estimation circuit 112, and supplies the result of the normalization to a coefficient updating control circuit 114. The coefficient updating control circuit 114 makes a decision according to the result of normalization in the normalizing circuit 113 as to whether the filter coefficient set is to be updated according to the value of a formula (18) to be described later and supplies the result of the decision to the first and second adaptive filters 105 and 106.

The first adaptive filter 105 receives the received signal selected by the first selector 103 as an input signal and produces a first echo replica corresponding to echo contained in a first mixed signal 14 by using the set of filter coefficients selected by the filter coefficient set selection circuit 104, the produced first echo replica being supplied to a first subtracter 107. The first subtracter 107 subtracts the first echo replica as the output of the first adaptive filter 105 from the first mixed signal 14 and provides the result as a first output signal 16. When the coefficient set updating control circuit 114 decides that updating of the filter coefficient set is required, the first adaptive filter 105 updates the filter coefficient set selected by the filter coefficient set selection circuit 104 such as to minimize the first output signal 16. The algorithm underlying this operation will be described later in connection with a formula (13).

The second adaptive filter 106, likewise, receives the received signal selected by the first selector 103 as an input signal and produces a second echo replica corresponding to echo contained in the second mixed signal 15 by using the filter coefficient set selected by the filter coefficient set selection circuit 104, the produced second echo replica being supplied to a second subtracter 108. The second subtracter 108 subtracts the second echo replica as the output of the second adaptive filter 106 from the second mixed signal 15 and provides the result as a second output signal 17. When the coefficient set updating control circuit 114 decides that filter coefficient set updating is required, the second adaptive filter 106 updates the filter coefficient set selected by the filter coefficient set selection circuit 104 such as to minimize the second output signal 17.

FIG. 2 is a block diagram showing the delay time difference estimation circuit in the first embodiment, in which the received signal has M-channels. The delay time difference estimation circuit 101 includes K (K>1) two-signal delay time difference estimation circuits $210_1$, $210_2$, ..., $210_K$ and a controller 205, and it receives a plurality of received signals $201_1$, $201_2$, ..., $201_M$ as the inputs and outputs delay time difference information 202, which is a set of a plurality of delay time differences corresponding to respective signal sets for each of two signals selected from the plurality of received signals $201_1$, $201_2$, ..., $201_M$. The K two-signal delay time difference estimation circuits $210_1$, $210_2$, ..., $210_K$ all are of the same structure and operate in the same way. Thus, in the following description of each two-signal delay time difference estimation circuit, the subscript i is omitted, and reference is made as two-signal-delay time difference estimation circuit 210, control signal 204 and two-signal delay time difference 203.

Two-signal delay time difference estimation circuit 210 receives as input signals the M channels received signals $201_1$, $201_2$, ..., $201_M$ and estimates delay time difference 203 between two signals among the received signals $201_1$, $201_2$, ..., $201_M$ that are designated by control signal 204, the result of the estimation being supplied to the controller 205.

The controller 205 receives two-signal delay time differences $203_1$, $203_2$, ..., $203_K$ output from the K two-signal delay time difference estimation circuits $210_1$, $210_2$, ..., $210_K$ as the input and supplies control signals $204_1$, $204_2$, ..., $204_K$ each for designating a set of received signals for two-signal delay time difference estimation to each of the two-signal delay time difference estimation circuits $210_1$, $210_2$, ..., $210_K$. The controller 205 outputs as the delay time difference information 202 all the two-signal delay time differences corresponding to the sets of two signals selected from the plurality of received signals $201_1$, $201_2$, ..., $201_M$.

In the delay time difference estimation circuit 101, it is possible to use a single circuit repeatedly in place of the two-signal delay time difference estimation circuits $210_1$, $210_2$, ..., $210_K$. Where the received signals are of M-channels, by preparing $M(M-1)/2$ two-signal delay time difference estimation circuits and effecting simultaneous two-signal delay time estimation with respect to all the sets of two channels selected from the M-channels of received signals, there is no need of repeatedly using each two-signal delay time difference estimation circuit, and thus it is possible to reduce the time required for the estimation. Meanwhile, denoting the delay time difference between a first and a second received signal selected from the M-channels of received signals by $t_{12}$, the delay time difference between the second and a third signal by $t_{23}$, the delay time difference $t_{13}$ between the first and third received signals can be obtained as:

$$t_{13} = t_{12} + t_{23} \quad (4)$$

Thus, it is possible to obtain a desired delay time difference between two signals on the basis of $(M-1)$ two-signal delay time differences. Where received signals are of 2-channels, all the delay time differences can be estimated by using a single two-signal delay time difference estimation circuit only once.

Figure 3:
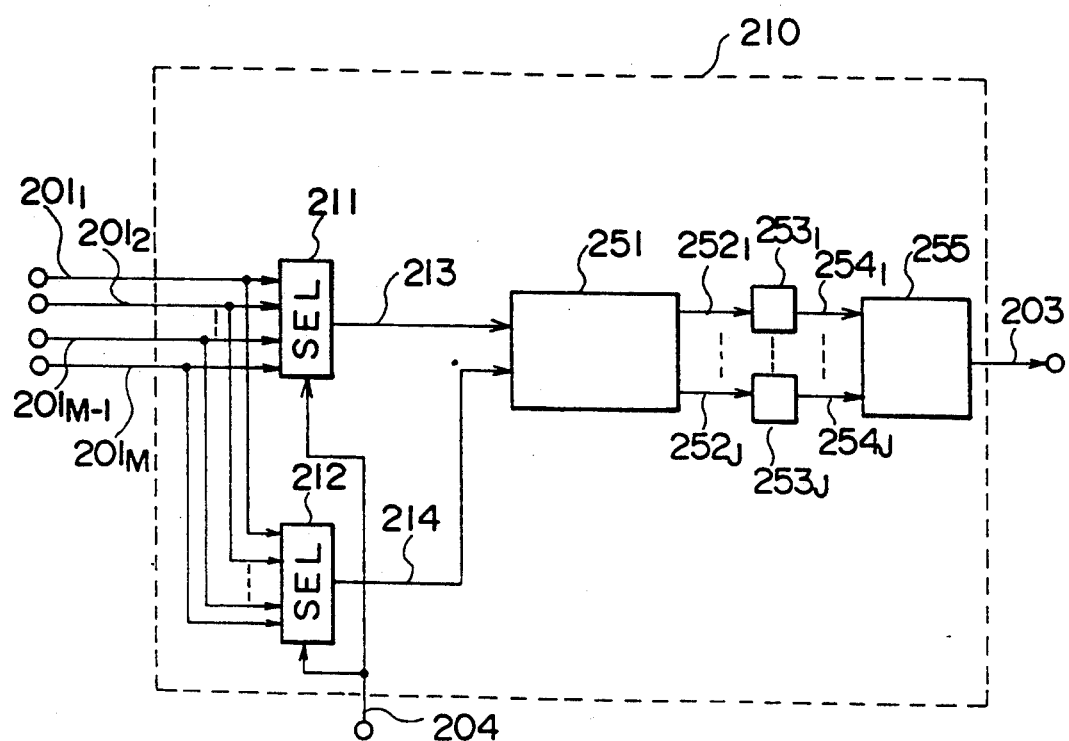
FIG. 3 is a block diagram showing a two-signal delay time difference estimation circuit in the first embodiment.

FIG. 3 is a block diagram showing the two-signal delay time difference estimation circuit 210 in the first embodiment. This two-signal delay time difference estimation circuit 210 receives a plurality of received signals $201_1, 201_2, \ldots, 201_M$ as input signals and estimates the delay time difference between two signals designated by the control signal 204 from among these received signals.

Now, the principles underlying delay time difference estimation using a cross-correlation function of two signals will be described. Denoting the levels of a first and a second received signal 213 and 214 by $x_1(n)$ and $x_2(n)$, the cross-correlation function of two signals 10 with respect to time difference m at instant n is given as:

$$R_{12}(n,m) = E[x_1(n), x_2(n+m)] \qquad (5)$$

Assuming steady received signal $x_1(n)$ and signal $$x_2(n) = x_1(n)(n - n_d),$$

$$\begin{aligned}
&E[(x_1(n) - x_2(n + m))^2] \\
&= E[(x_1(n) - x_1(n - n_d + m))^2] \\
&= E[(x_1^2(n)] - 2E[x_1(n)x_2(n + m)] + E[x_2^2(n + m)] \\
&= E[(x_1^2(n)] + E[x_2^2(n + m)] - 2R_{12}(n,m)
\end{aligned} \qquad (6)$$

and thus the cross-correlation function $R_{12}(n, m)$ between $x_1(n)$ and $x_2(n)$ is $$\begin{aligned}
R_{12}(n,m) = &\tfrac{1}{2} \\
&[E[(x_1^2(n)] + E[x_2^2(n+m)]- \\
&]-E[(x_1(n)-x_1(n-n_d+m))^2]
\end{aligned} \qquad (7)$$

If $x_1(n)$ and $x_2(n)$ are steady, received signal power levels $E[x_1^2(n)]$ and $E[x_2^2(n)]$ are constants. Thus, by setting the average power level of the received signals as:

$$P(n) = \tfrac{1}{2} [E[(x_1^2(n)] + E[x_2^2(n+m)]] \qquad (8)$$

we obtain:

$$R_{12}(n,m) = P(n) - \tfrac{1}{2} E[(x_1(n) - x_1(n - n_d + m))^2] \qquad (9)$$

Thus, $R_{12}(n, m)$ is maximum when $m = n_d$.

When $x_1(n)$ and $x_2(n)$ are 180 degrees out of phase, that is, $x_2(n) = -x_1(n - n_d)$, from $$\begin{aligned}
&E[(x_1(n) - x_2(n + m))^2] \\
&= E[(x_1(n) - x_1(n - n_d + m))^2] \\
&= E[(x_1^2(n)] + E[x_2^2(n)] - 2R_{12}(n,m)
\end{aligned} \qquad (10)$$

$R_{12}(n, m)$ is:

$$R_{12}(n,m) = -[P(n) - \tfrac{1}{2}]E[(x_1(n) - x_1(n - n_d + m))^2]] \qquad (11)$$

Hence, when $m = n_d$, $R_{12}(n, m)$ is minimum, and the absolute value thereof is maximum.

From this fact, it will be seen that it is possible to estimate the delay time difference 208 between the first and second received signals 218 and 214 from the time difference m corresponding to the maximum absolute value of the cross-correlation function $R_{12}(n, m)$.

Two signals for obtaining the delay time difference are selected by the respective selectors 211 and 212. More specifically, one of the two signals designated by the control signal 204, which designates the received signals as the subject of obtaining delay time difference, is selected as the first received signal 213 by the first selector 211, which receives a plurality of received signals $201_1, 201_2, \ldots, 201_M$ as the input. Likewise, the other one of the two signals designated by the control signal 204 is selected as the second received signal 214 by the second selector 212, which receives the received signals $201_1, 201_2, \ldots, 201_M$ as the input.

A cross-correlation function value estimation circuit 251 estimates values $252_1, 252_2, \ldots, 252_J$ corresponding to J predetermined time differences among the values of the cross-correlation function between the first and second received signals 213 and 214. An absolute value calculation circuit group consisting of J absolute value calculation circuits $253_1, 253_2, \ldots, 253_J$ which are in one-to-one correspondence to the cross-correlation function values $252_1, 252_2, \ldots, 252_J$, calculates the absolute values $254_1, 254_2, \ldots, 254_J$ of the cross-correlation function values $252_1, 252_2, \ldots, 252_J$.

A judging circuit 255 derives a time difference which maximizes the absolute values $254_1, 254_2, \ldots, 254_J$ of the cross-correlation function values $252_1, 252_2, \ldots, 252_J$, the result being made the two-signal delay time difference 203.

Figure 4:
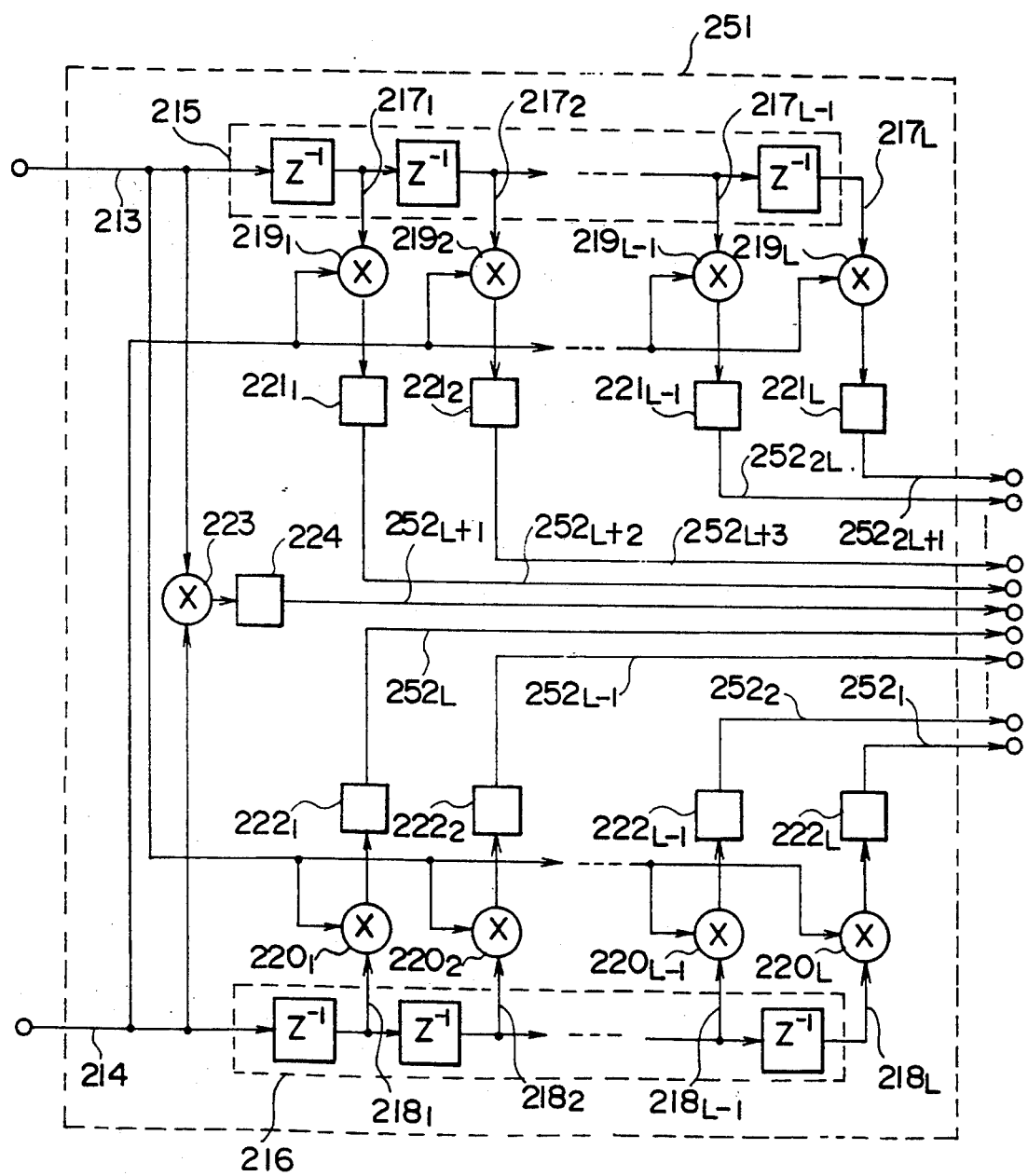
FIG. 4 is a block diagram showing a cross-correlation function value estimation circuit in the first embodiment.

FIG. 4 is a block diagram showing the cross-correlation function value estimation circuit 109 (251 in FIG. 4) in the first embodiment. This cross-correlation function value estimation circuit 251 estimates $(J = 2L + 1)$ cross-correlation function values $252_1, 252_2, \ldots, 252_{2L+1}$ corresponding to time differences $m = -L, \ldots, 0, \ldots, +L$. Of the circuit 251, a portion for the cross-correlation function values corresponding to time differences m of the positive sign includes a first tapped delay line 215 constituted by L delay elements, L multipliers $219_1, 219_2, \ldots, 219_L$, and L integrators $221_1, 221_2, \ldots, 221_L$. The first tapped delay line 215 causes delay of the first received signal 213 by one sample period after another. The L multipliers $219_1, 219_2, \ldots, 219_L$ constitute a first multiplier group for multiplying each of the tapped outputs $217_1, 217_2, \ldots, 217_L$ of the first tapped delay line 215 by the second received signal 214. The outputs of the multipliers $219_1, 219_2, \ldots, 219_L$ are integrated by a first integrator group consisting of L integrators $221_1, 221_2, \ldots, 221_L$. The results of the integration are values of the cross-correlation function $R_{12}(n, m)$ corresponding to $m = 1, 2, \ldots, L$.

Of the circuit 251, a portion for the cross-correlation function values corresponding to the time differences m of the negative sign includes a second tapped delay line 216 constituted by L delay elements, L multipliers $220_1, 220_2, \ldots, 220_L$ and L integrators $222_1, 222_2, \ldots, 222_L$. The second tapped delay line 216 delays the second received signal 214. The L multipliers $220_1, 220_2, \ldots, 220_L$ constitute a second multiplier group for multiplying each of the tapped outputs $218_1, 218_2, \ldots, 218_L$ of the second tapped delay line 216 by the first received signal 213. The outputs of the multipliers $220_1, 220_2, \ldots, 220_L$ are integrated by a second integrator group consisting of L integrators $222_1, 222_2, \ldots, 222_L$. The results of integration are values of the cross-correlation function $R_{12}(n, m)$ corresponding to $m = -1, -2, \ldots, -L$.

Of the estimation circuit 251, a portion for the cross-correlation function values corresponding to the time difference m of zero includes a multiplier 223 and an integrator 224. The multiplier 223 multiplies the first and second received signals 213 and 214 by each other. The integrator 224 integrates the output of the multiplier 223 to produce a cross-correlation function value of $R_{12}(n, 0)$.

Figure 5:
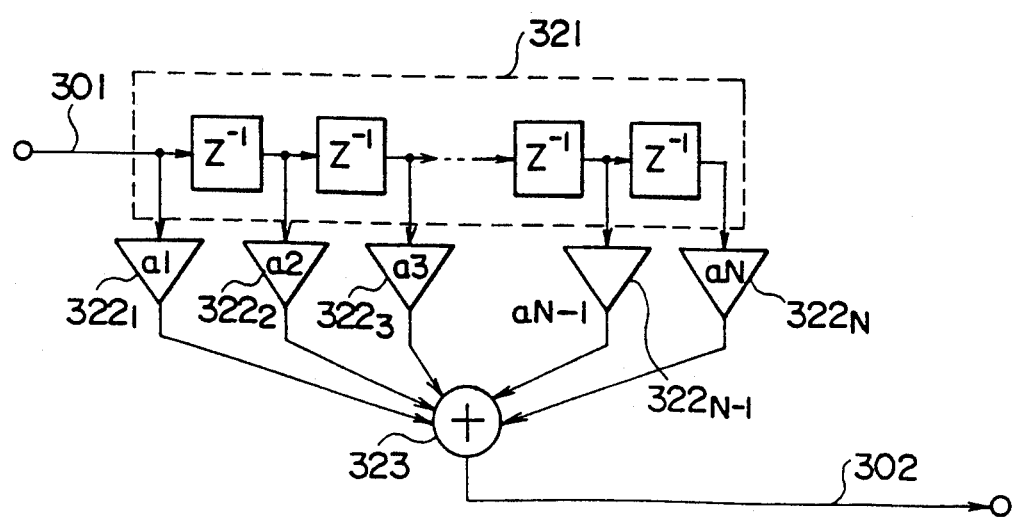
FIG. 5 is a block diagram showing a transversal integrator used in the first embodiment.

FIG. 5 is a block diagram showing a transversal integrator used for the integrators $221_1, 221_2, \ldots, 221_L, 222_1, 222_2, \ldots, 222_L, 224$ in this embodiment. This integrator produces output signal 302 as a result of the integration of input signal 301, and it includes a tapped delay line 321, N coefficient multipliers $322_1, 322_2, \ldots, 322_N$ and an adder 323. The input signal 301 is stored in the tapped delay line 321. The N coefficient multipliers $322_1, 322_2, \ldots, 322_N$, which are in one-to-one correspondence to the tapped outputs of the tapped delay line 321, each multiply each of the tapped outputs of the tapped delay line 321 by a constant predetermined value for each tap. The adder 323 obtains the sum of the product results in the N coefficient multipliers $322_1, 322_2, \ldots, 322_N$, the sum being made the integrator output 302.

Figure 6:
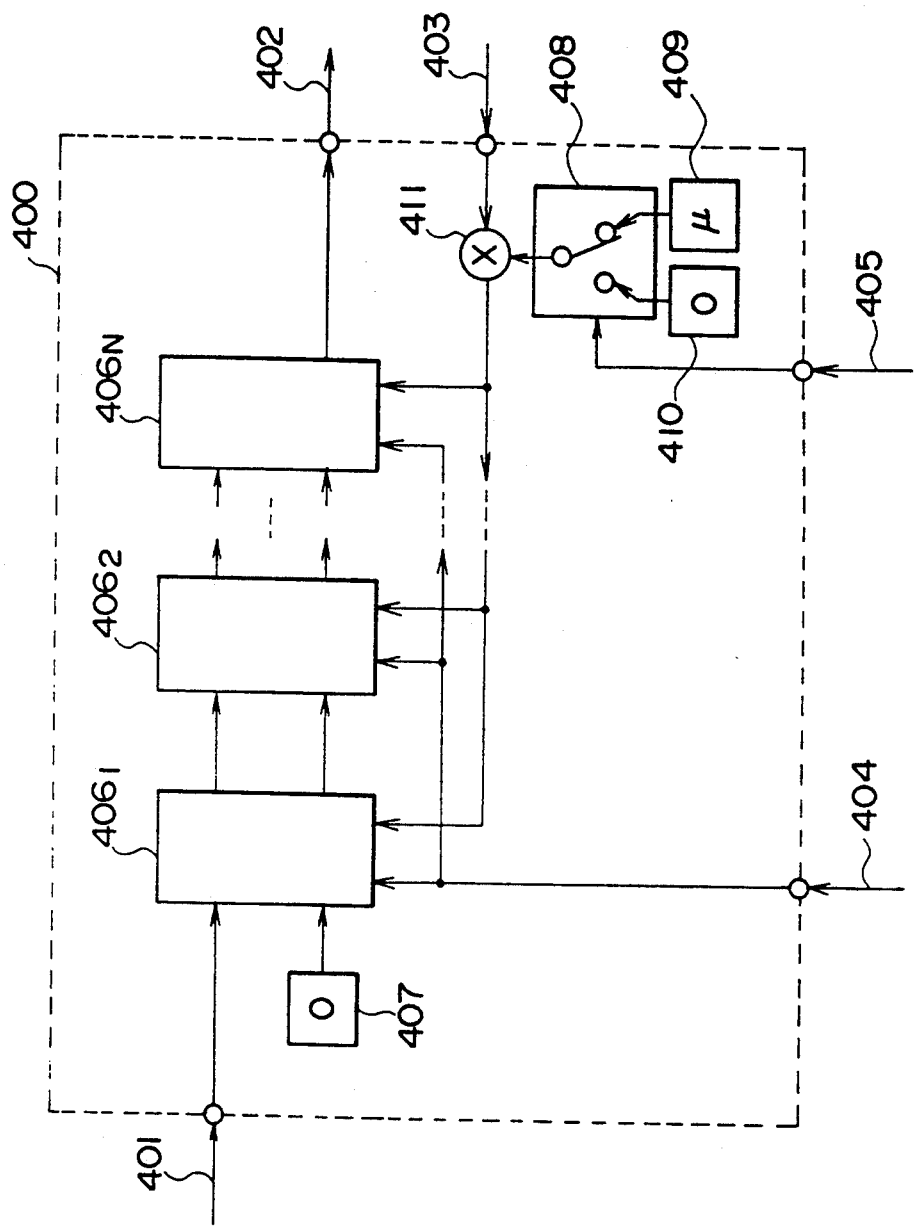
FIG. 6 is a block diagram showing a first and a second adaptive filters in the first and second embodiments.

FIG. 6 is a block diagram showing the construction of the first and second adaptive filters 105 and 106 in this embodiment. This adaptive filter 400 receives a received signal 401 as an input signal and obtains an output signal 402 by using a set of filter coefficients designated by a filter coefficient set selection signal 404. When coefficient updating control signal 405 is indicative of coefficient updating, the set of filter coefficients designated by the filter coefficient set selection signal 404 is updated such as to reduce error signal 403. As the adaptive filter, a transversal adaptive filter based on a LMS (least mean square) algorithm is disclosed in Proceedings of the IEEE, Vol. 63, No. 12, pp. 1692-1716, 1975, USA (hereinafter referred to as Literature No. 5), and a transversal adaptive filter based on a learning identification method is disclosed in IEEE Transactions on Automatic Control, Vol., AC-12, No. 3, 1967 USA (hereinafter referred to as Literature No. 6). In this instance, the operation of the adaptive filter will be described by assuming the transversal adaptive filter is based on the LMS algorithm.

Denoting the number of taps of the adaptive filter 400 by N, the input signal 401 to the adaptive filter at instant n by $x(n)$, the output signal 402 of the adaptive filter by $y(n)$, the error signal 403 by $e(n)$, the i-th coefficient in the m-th one of a plurality of sets of filter coefficients by $w_m(i, n)$, the output signal 402 is given as:

$$y(n) = \sum_{i=0}^{N-1} w_m(i,n)x(n - i) \quad (12)$$

and the filter coefficient set updating is given as:

$$w_m(i,n+1) = w_m(i,n) + \mu e(n)x(n-i) \quad (13)$$

The above process is realized by cascade connecting operational circuits each for operation for one tap. The i-th operational circuit receives delay line input $x_{i-1}(n)421$, adder input $y_{i-1}(n)422$, filter coefficient selection signal 404 and filter coefficient updating amount $\Delta(n)424$ as the inputs and executes delaying operation given as:

$$x_i(n) = x_{i-1}(n-1) \quad (14)$$

convolution operation given as:

$$y_i(n) = y_{i-1}(n) + w_m(i-1,n)x(n-i+1) \quad (15)$$

and coefficient updating operation given as:

$$w_m(i-1,n+1) = w_m(i-1,n) + \Delta(n)x(n-i+1) \quad (16)$$

to output delay line output $x_i(n)$ and adder output. The filter coefficient updating amount $\Delta(n)$ is defined as $$\Delta(n) = \mu e(n) \quad (17)$$

The input signal 401 to the adaptive filter is supplied as the delay line input to a first operational circuit $406_1$. The filter coefficient set selection signal 404 is supplied to N operational circuits $406_1, 406_2, \ldots, 406_N$. The first operational circuit $406_1$ receiving the input signal 401 to the adaptive filter as an input signal, executes the delaying operation, convolution operation and coefficient updating operation with constant 0 stored in a first constant register 407 as the adder input and supplies the delay line output as the delay line input to a second operational circuit $406_2$ and adder output as the adder input to the second operational circuit $406_2$. The second operational circuit $406_2$ receiving the delay line output of the first operational circuit $406_2$ as the delay line input, executes the delaying operation, convolution operation and coefficient updating operation with the adder output of the first operational circuit $406_1$ as the adder input and supplies the delay line output as the delay line input to a third operational circuit $406_3$ and the adder output as the adder input to the third operational circuit $406_3$. Likewise, the i-th operational circuit $406_i (i=3, \ldots, N-1)$ receiving the delay line output of the $(i-1)$-th operational circuit as the delay line input and the adder output of the $(i-1)$-th operational circuit as the adder input, executes the delaying operation, convolution operation and coefficient updating operation with the adder output of the $(i-1)$-th operational circuit as the adder input and supplies the delay line output as the delay line input to the $(i+1)$-th operational circuit $406_{i+1}$ and the adder output as the adder input to the $(i+1)$-th operational circuit $406_{i+1}$. Similarly, the N-th operational circuit $406_N$ receives the delay line output of the $(N-1)$-th operational circuit as its delay line input and the adder output of the $(N-1)$-th operational circuit as its adder input for executing the delaying operation, convolution operation and coefficient updating operation and outputs the adder output as the output signal 402 of the adaptive filter 400. The delay line output of the N-th operational circuit $406_N$ is not used.

The filter coefficient updating control is effected through switching of the step size $\mu$ by utilizing the fact that no filter coefficient set updating is effected if the step size $\mu$ is set to 0. A selector 408 selects positive constant $\mu$ stored in a second constant register 409 when the coefficient updating control signal indicates filter coefficient updating, while when the control signal indicates stopping of the filter coefficient updating it selects constant 0 stored in a third constant register 410, the selected constants being supplied as the step size to a multiplier 411. The multiplier 411 obtains the product of the step size and the error signal 403 and supplies the product as the coefficient updating amount to the operational circuits $406_1, 406_2, \ldots, 406_N$.

Figure 7:
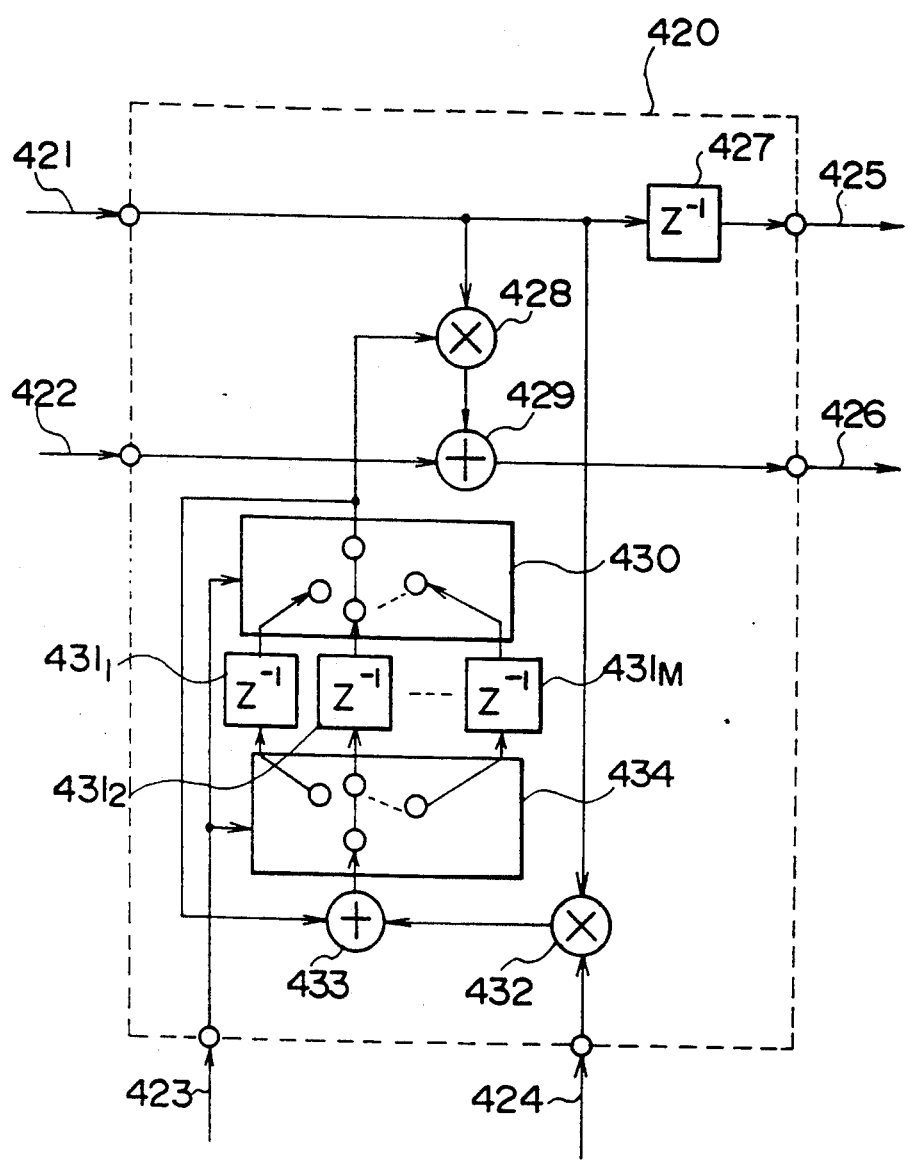
FIG. 7 is a block diagram showing an example of operational circuits shown in FIG. 6.

FIG. 7 is a block diagram showing the construction of the operational circuits $406_1, 406_2, \ldots, 406_N$.

The operational circuit 420 receives delay line input 421, adder input 422, filter coefficient selection signal 423 and filter coefficient updating amount 424 as the input for executing the delaying operation, convolution operation and coefficient updating operation and outputs delay line output 425 and adder output 426.

The delay line input 421 is supplied to a delay line 427, a first and a second multiplier 428 and 432. The delay line 427 delays the delay line input 421 by one sample period and outputs the result as the delay line output 425. A first multiplier 428 multiplies the delay line input 421 and the filter coefficient selected by a selector 430 and outputs the result product to a first adder 429. The first adder 429 adds the product from the first multiplier 428 and the adder input 422 and outputs the resultant sum as the adder output 426.

The selector 430 selectively supplies one of the values from delay lines $431_1$, $431_2$, ..., $431_M$ to the first multiplier 428 and a second adder 433. A second multiplier 432 multiplies the delay line input 421 and filter coefficient updating amount 424 and supplies the resultant product to the second adder 433. The second adder 433 adds together the product of the second multiplier 432 and the filter coefficient selected by the selector 430 and supplies the resultant sum to a distributor 434. The distributor 434 stores the sum from the second adder 433 into one of the delay lines $431_1$, $431_2$, ..., $431_M$ that is designated by the filter coefficient selection signal 423.

Now, the principles underlying fast detection of the movement or replacement of the speaker will be described. From the formulas (9) and (11), it will be seen that the absolute value $|R_{12}(n, m)|$ of cross-correlation function value between two signals takes the maximum value $P(n)$ when $m$ is equal to the delay time difference between two signals. Thus, what is obtained by normalizing the absolute value of cross-correlation function value between two signals with the average power level thereof, i.e., $$C_{12}(n,m) = |R_{12}(n,m)|/P(n) \quad (18)$$

takes the maximum value of 1 when $m$ is equal to the delay time difference between two signals. By utilizing this character, it is possible to detect the movement or change of the talker.

In this embodiment, cross-correlation function of two signals is used for the estimation of delay time between two signals and filter coefficient set updating control. For the estimation of cross-correlation function value, time average is used. To obtain accurate two-signal delay time difference estimation, the two-signal delay time difference estimation circuit (101 in FIG. 1) uses time average for long time, while the filter coefficient updating control (104 in FIG. 1) uses time average for short time in order to increase the tracking speed to the movement or change of the talker.

Immediately after the movement or change of the talker, the two-signal delay time difference estimation circuit 101 using time average for long time holds the delay time difference before the movement or change of the talker. Meanwhile, the cross-correlation function value estimation in the cross-correlation function value estimation circuit 109 for the filter coefficient updating control 114 uses time average for short time, and thus the cross-correlation function value corresponding to the delay time difference before the movement or change of the talker is quickly reduced. That is, it is possible to quickly grasp the movement or change of the talker. Thus, in the period immediately after the movement or change of the talker and in which the estimated delay time value $m$ is different from the true value $m$, the normalized cross-correlation function value: $C_{12}(n,m)$ is a small value. Further, if $C_{12}(n,m)$ is considerably greater than unity, it is thought to be due to generation of an estimation error right after the movement or change of the talker. After the movement or change of the talker has been tracked by the two-signal delay time difference estimation circuit 101 the normalized cross-correlation function value $C_{12}(n,m)$ is close to unity.

Under the above principles, when the normalized cross-correlation function value $C_{12}(n,m)$ is close to unity, the coefficient set updating control circuit 114 updates the filter coefficient set. If the value is greatly separated from unity, the circuit 114 judges that the prevailing instant is immediately after the movement or change of the talker and stops the filter coefficient set updating. That is, in FIG. 6 the selector 408 selects the constant register 410.

While the first embodiment of the invention was described with reference to FIGS. 1 to 7, in this embodiment the two-signal delay time difference estimation circuit 210 shown in FIG. 3 is used, which estimates the delay time difference between two signals by finding out a time difference such as to make maximum the absolute value of the two-signal cross-correlation function value. In a different embodiment of the invention, it is possible to obtain estimation of the delay time difference between two signals by estimating two signals mutually with two adaptive filters and finding out a filter coefficient such as to maximize the adaptive filter coefficient absolute value.

Figure 8:
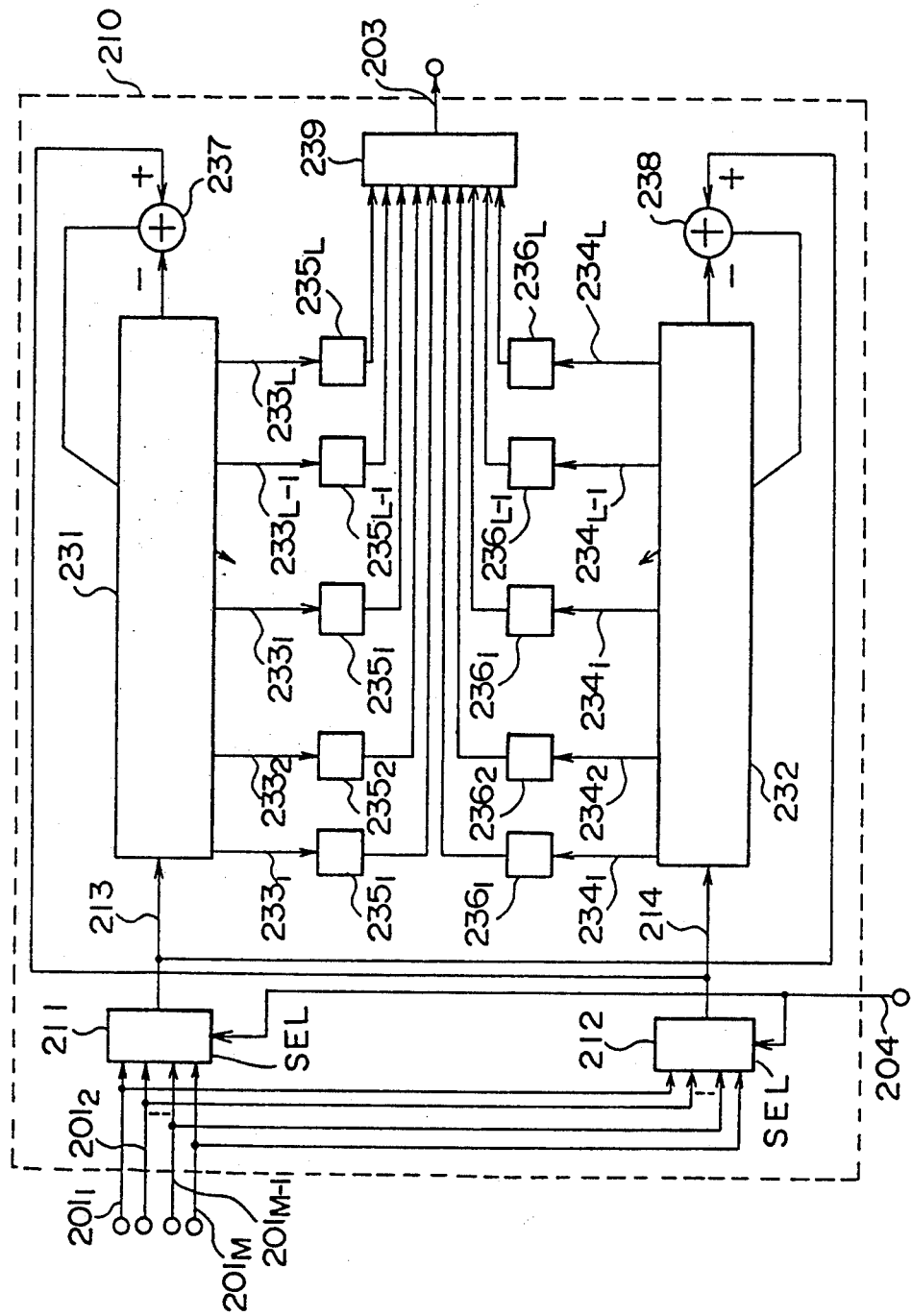
FIG. 8 is a block diagram showing a different example of two-signal delay time difference estimation circuit.

FIG. 8 is a block diagram showing a different example of the two-signal delay time difference estimation circuit 210. This two-signal delay time difference estimation circuit 210 receives a plurality of received signals $201_1$, $201_2$, ..., $201_M$ as input signals and estimates delay time difference 203 between two signals designated by control signal 204 from among the received signals.

The delay time difference between two signals is estimated by using filter coefficients of two adaptive filters which mutually estimate two signals. In the adaptive filter, which receives the shorter-delay-time received signal as the input and estimates the longer-delay-time received signal, the filter coefficient absolute value of a tap which provides the input signal with the closest delay to the delay time difference between two signals is maximum. On the other hand, in the adaptive filter receiving the longest-delay-time received signal as the input and estimating the shortest-delay-time received signal, sufficient filter coefficient growth can not be obtained because of low accuracy of future signal estimation. Therefore, the filter coefficient is small compared to the adaptive filter estimating the longer-delay-time received signal.

On the basis of this fact, the two adaptive filters mutually estimate two signals for finding out a filter coefficient corresponding to the maximum adaptive filter coefficient absolute value, thus permitting estimation of the delay time difference between the first and second received signals 213 and 214.

A first selector 211, which receives a plurality of received signals $201_1$, $201_2$, ..., $201_M$ as the input, selects one of two signals designated by control signal 204 for designating received signals as the subject of delay time difference estimation, and supplies the result of the selection as first received signal 213 to a first adaptive filter 231 and a second subtracter 238. A second selector 212, which receives the received signals $201_1, 201_2, \ldots, 201_M$ as the input, selects the other one of the two signals designated by the control signal 204, and supplies the result of the selection as second received signal 214 to a second adaptive filter 232 and a first subtracter 237.

The first L-tap transversal adaptive filter 231 receiving the first received signal 213 as the input estimates the second received signal 214 and supplies the estimated signal to the first subtracter 237. The first subtracter 237 subtracts the output of the first transversal adaptive filter 231 from the second received signal 214. The first transversal adaptive filter 231 is controlled so as to minimize the output of the first subtracter 237.

The second L-tap adaptive filter 232 receiving the second received signal 214 as the input estimates the first received signal 213 and supplies the estimated signal to the second subtracter 238. The second subtracter 238 subtracts the output of the second transversal adaptive filter 232 from the first received signal 213. The second transversal adaptive filter 232 is controlled such as to minimize the output of the second subtracter 238.

Coefficients $233_1, 233_2, \ldots, 233_L$ of the first adaptive filter 231 are supplied to a first absolute value calculation circuit group consisting of L absolute value calculation circuits $235_1, 235_2, \ldots, 235_L$, while coefficients $234_1, 234_2, \ldots, 234_L$ of the second adaptive filter 232 are supplied to a second absolute value calculation circuit group consisting of L absolute value calculation circuits $236_1, 236_2, \ldots, 236_L$. Each obtained absolute value is supplied to a Judging circuit 239. The judging circuit 239 determines a filter coefficient corresponding to the maximum absolute value and estimates two-signal delay time difference 203 according to the filter coefficient of the maximum absolute value.

Figure 9:
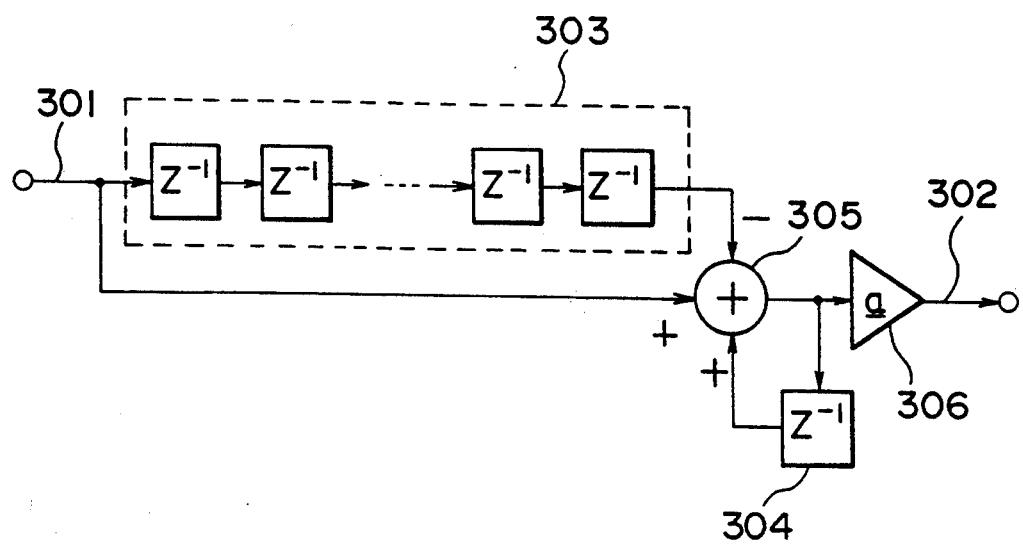
FIG. 9 is a block diagram showing a different example of integrators shown in FIG. 4.

FIG. 9 is a block diagram showing a different example of the integrators $221_1, 221_2, \ldots, 221_L, 222_1, 222_2, \ldots, 222_L$, 224 shown in FIG. 4. This integrator is a simple average calculation circuit. It produces output signal 302 as a result of integration of input signal 301, and includes a D sample delay line 303, a delay line 304, an adder 305 and a coefficient multiplier 306. The input signal 301 is supplied to the adder 305 and also stored in the delay line 303. The delay line 303 delays the input signal 301 by D sample period before supplying the same to the adder 305. The adder 305 adds the output of the delay line 304 and the input signal 301 and subtracts the output of the delay line 303 from the sum. The output of the adder 305 is stored in the delay line 304 and also supplied to a coefficient multiplier 306. The coefficient multiplier 306 multiplies the output of the adder 305 by $\underline{a}$ to obtain integrator output 302. $\underline{a}$ is any positive number, and when $\underline{a}$ is set to $\underline{a}=1/D$, the result of integration is the simple average of input signal.

In this embodiment, the integrator input signal 301 is supplied to the delay line 303 and adder 305, and the coefficient multiplier 306 multiplies the output of the adder 305 by $\underline{a}$ to produce the product as the integrator output signal 302. However, it is possible as well to change the position of the coefficient multiplier 306 such as to let the integrator input signal 301 be supplied to the coefficient multiplier 306 for multiplication by $\underline{a}$ and supply the product to the delay line 303 and the adder 305 so as to make the output of the adder 305 as the integrator output signal 302.

Figure 10:
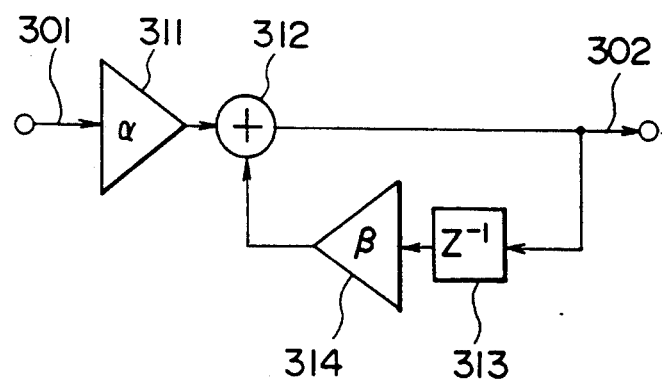
FIG. 10 is a block diagram showing a further example of integrators shown in FIG. 4.

FIG. 10 is a block diagram showing a further example of the integrators $221_1, 221_2, \ldots, 221_L, 222_1, 222_2, \ldots, 222_L$, 224 shown in FIG. 4. This integrator is a first order recursive integrator. It includes a first coefficient multiplier 311, an adder 312, a delay line 313 and a second coefficient multiplier 314. It integrates input signal 301 and outputs the result as output signal 302. The first coefficient multiplier 311 multiplies the integrator input signal 301 by $\alpha$ and supplies the product to the adder 312. The adder 312 adds the product outputs of the first and second multipliers 311 and 314 and outputs the sum as the integrator output signal 302 and also to the delay line 313. The delay line 313 delays the sum output of the adder 312 by one sample period and supplies the result to the second coefficient multiplier 314. The second coefficient multiplier 314 multiplies the output of the delay line 313 by $\beta$ and supplies the product to the adder 312. $\alpha$ is a positive number, and $\beta$ is a constant such that $0<\beta<1$. If $\beta=1-\alpha$ ($0<\alpha<1$), the integrator output signal 302 is the weighted running average of the input signal 301.

In this embodiment, the first coefficient multiplier 311 multiplies the integrator input signal 301 by $\alpha$ and supplies the result to the adder 312 to make the output thereof to be the integrator output signal 302. However, it is possible as well to change the position of the coefficient multiplier 311 to supply the integrator input signal 301 to the adder 312 and let the output thereof be multiplied by $\beta$ in the first coefficient multiplier 311 so as to make the product to be the integrator output signal 302.

While a first order integrator is shown in FIG. 10, the integrator may of any order. The recursive integrator is a small hardware element and is capable of integration for a long time. It is less subject to noise influence.

Figure 11:
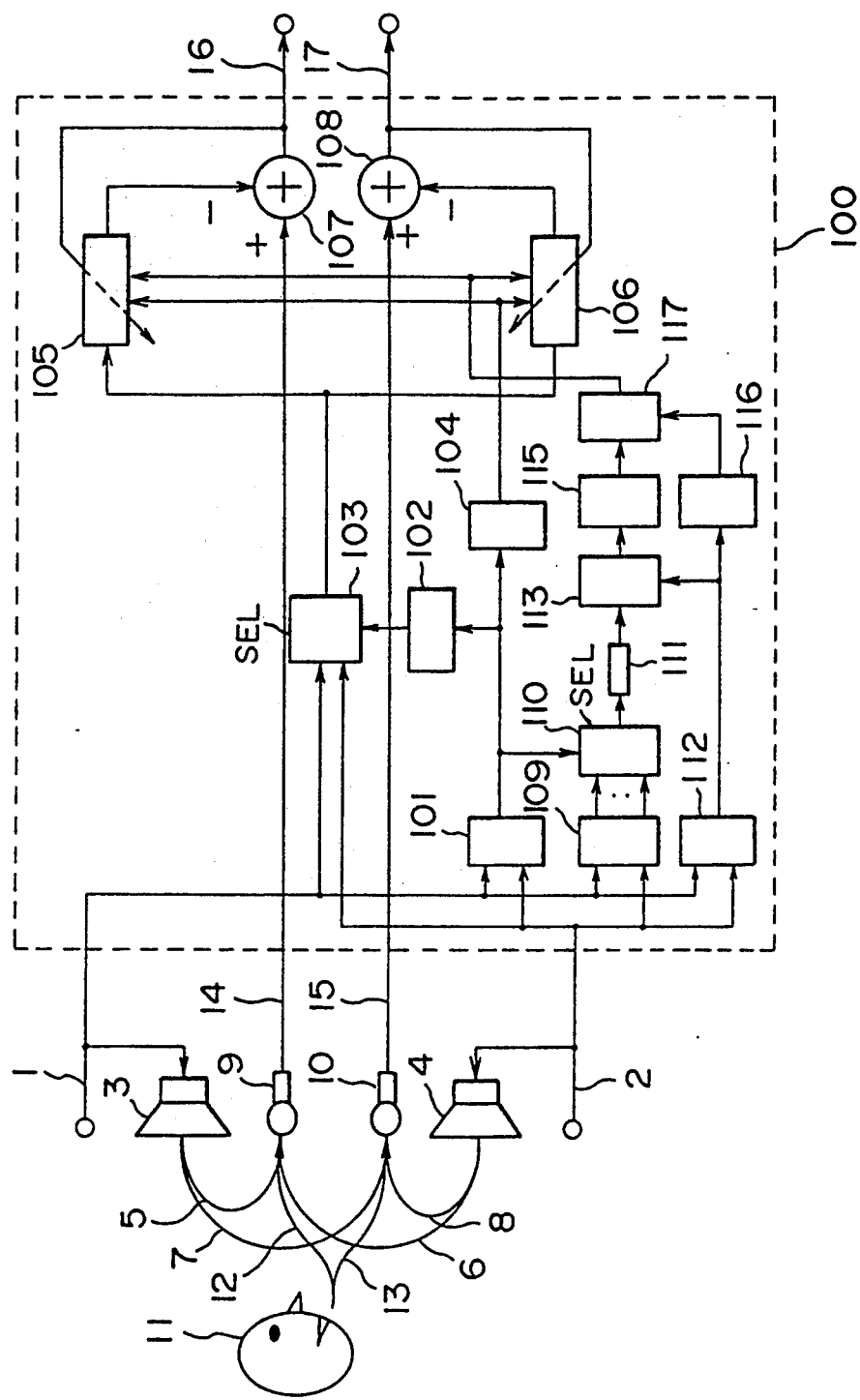
FIG. 11 is a block diagram showing a second embodiment of the multi-channel echo canceler according to the invention, in which received and transmitted signals are 2-channel signals.

FIG. 11 is a block diagram showing a second embodiment of the multi-channel echo canceler according to the invention, in which received and transmitted signals are 2-channel signals. A delay time difference designation circuit 101 receives a first and a second received signal 1 and 2 as the inputs and estimates the delay time difference therebetween, the result of the estimation being supplied to a received signal selection circuit 102, a filter coefficient set selection circuit 104 and a second selector 110. The received signal selection circuit 102 detects the shortest-delay-time received signal according to the result of estimation in the delay time difference estimation circuit 101 and supplies the result of the detection to a first selector 103. The first selector 103 selectively supplies the shorter-delay-time one of the received signals 1 and 2 to a first and a second adaptive filter 105 and 106 according to the result of detection in the received signal selection circuit 102. The filter coefficient set selection circuit 104 selects a set of filter coefficients to be used in the first and second adaptive filters 105 and 106 according to the result of estimation in the delay time difference estimation circuit 101 and supplies the result of selection to the first and second adaptive filters 105 and 106.

A cross-correlation function value estimation circuit 109 estimates cross-correlation function values between the two received signals 1 and 2 and supplies the result of the estimation to the second selector 110. The selector 110 selectively supplies one of the cross-correlation function values estimated by the cross-correlation function value estimation circuit 109 that corresponds to the delay time difference between the two received signals 1 and 2 that is estimated by the delay time difference estimation circuit 101 to an absolute value calculation circuit 111. The absolute value calculation circuit 111 calculates the absolute value of the cross-correlation function value selected by the second selector 110 and supplies the calculated absolute value to a normalizing circuit 113. A power level estimation circuit 112 estimates the average power level of the two received signals 1 and 2 and supplies the result of the estimation to the normalizing circuit 113 and a second judging circuit 116. The normalizing circuit 113 normalizes the absolute value obtained in the absolute value calculation circuit 111 with the average power level of the received signals that is estimated by the power level estimation circuit 112, and supplies the normalized result to a first judging circuit 115.

The first judging circuit 115 judges whether the result of normalization in the normalizing circuit 113 is in a predetermined range and supplies the result of the judgment to a coefficient set updating control circuit 117. A second judging circuit 116 judges whether the result of estimation of the power level estimation circuit 112 is greater than a predetermined threshold level and supplies the result of the judgment to the coefficient set updating control circuit 117. The coefficient set updating control circuit 117 makes a decision as to whether filter coefficient set updating is to be done according to the result of judgment in the first and second judging circuits 115 and 116 and supplies the result of the judgment to the first and second adaptive filters 105 and 106. When and only when the first judging circuit 115 decides that the result of normalization in the normalizing circuit 113 is in a predetermined range while the second judging circuit 116 decides that the result of estimation in the power level estimation circuit 112 is greater than a predetermined threshold level, the filter coefficient set is updated, and otherwise it is not updated.

The first adaptive filter 105 receives the received signal selected by the first selector 103 as an input signal and generates a first echo replica corresponding to echo contained in a first mixed signal 14 by using the filter coefficient set selected by the filter coefficient set selection circuit 104, the produced echo replica being supplied to a first subtracter 107. The first subtracter 107 subtracts the first echo replica as the output of the first adaptive filter 105 from the first mixed signal 14 and outputs the result as a first output signal 16. When the coefficient set updating control circuit 117 decides that filter coefficient set updating is required, the first adaptive filter 105 updates the filter coefficient set selected by the filter coefficient set selection circuit 104 such as to minimize the first output signal 16.

The second adaptive filter 106 likewise receives the received signal selected by the first selector 103 as an input signal and produces a second echo replica corresponding to echo contained in a second mixed signal 15 by using the filter coefficient set selected by the filter coefficient set selection circuit 104, the produced echo replica being supplied to a second subtracter 108. The second subtracter 108 subtracts the second echo replica as the output of the second adaptive filter 106 from the second mixed signal 15 and outputs the result as a second output signal 17. When the coefficient set updating control circuit 117 decides that the filter coefficient set updating is required, the second adaptive filter 106 updates the filter coefficient set selected by the filter coefficient set selection circuit 104 so as to minimize the second output signal 17.

Figure 12:
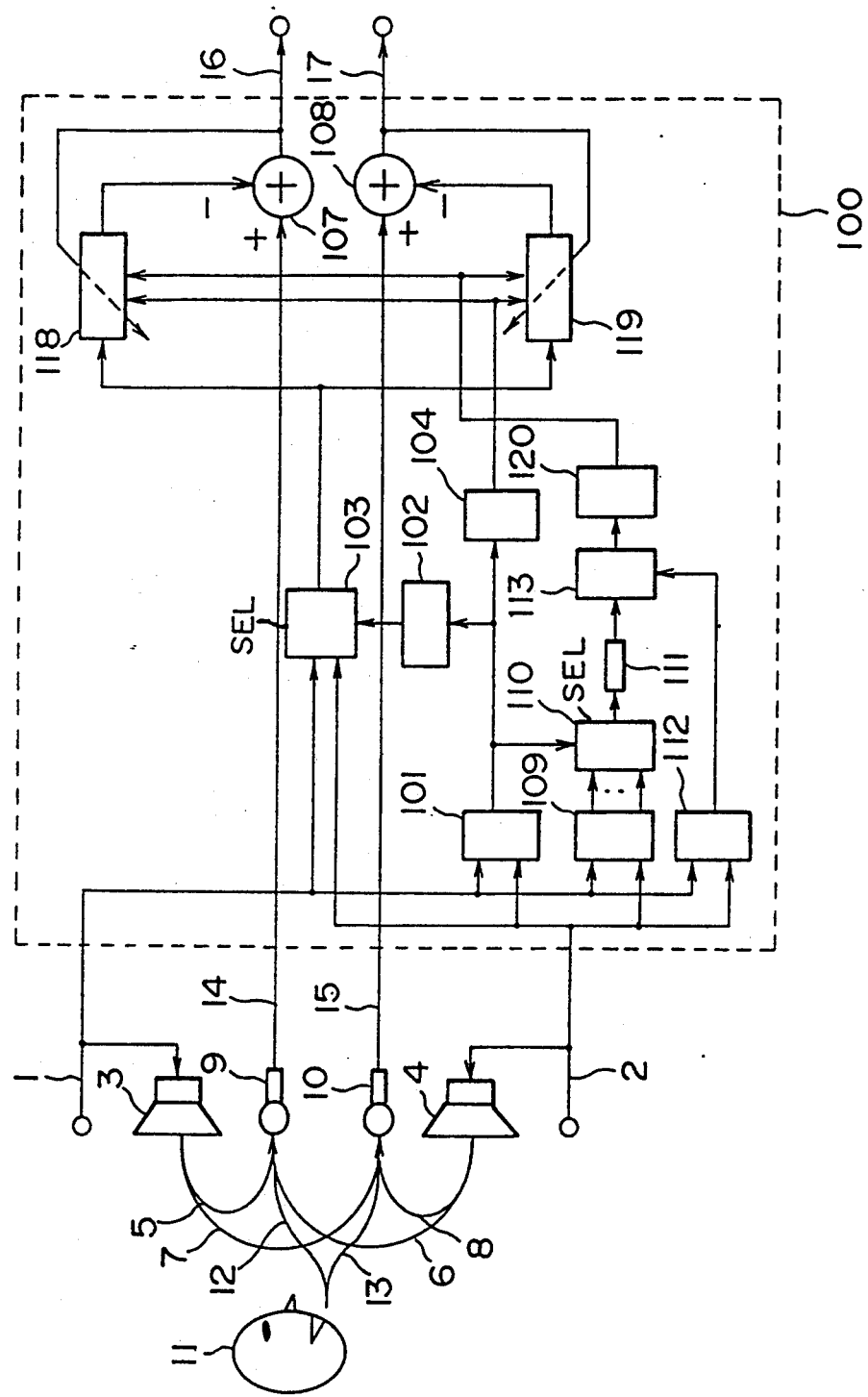
FIG. 12 is a block diagram showing a third embodiment of the multi-channel echo canceler according to the invention, in which received and transmitted signals are 2-channel signals.

FIG. 12 is a block diagram showing a third embodiment of the multi-channel echo canceler according to the invention, in which received and transmitted signals are 2-channel signals. A delay time difference estimation circuit 101 receives a first and a second received signal 1 and 2 as input signals and estimates the delay time difference therebetween, the result of the estimation being supplied to a received signal selection circuit 102, a filter coefficient set selection circuit 104 and a second selector 110. The received signal selection circuit 102 detects the shortest-delay-time received signal according to the result of estimation in the delay time difference estimation circuit 101 and supplies the result of detection to a first selector 103. The first selector 103 selectively supplies the shorter-delay-time one of the received signals 1 and 2 to a first and a second adaptive filter 118 and 119 according to the result of detection in the received signal selection circuit 102. The filter coefficient set selection circuit 104 selects a set of filter coefficients to be used in the first and second adaptive filters 118 and 119 according to the result of estimation in the delay time difference estimation circuit 101 and supplies the result of the selection to the first and second adaptive filters 118 and 119.

A cross-correlation function value estimation circuit 109 estimates a cross-correlation function value between the two received signals 1 and 2 and supplies the result of the estimation to the second selector 110. The second selector 110 selectively supplies a value corresponding to the delay time difference between the two received signals 1 and 2 that is estimated by the delay time difference estimation circuit 101 among the cross-correlation function values estimated by the cross-correlation function value estimation circuit 109 to an absolute value calculation circuit 111. The absolute value calculation circuit 111 calculates the absolute value of the cross-correlation function value selected by the second selector 110 and supplies the calculated absolute value to a normalizing circuit 113. A power level estimation circuit 112 estimates the average power level of the two received signals 1 and 2 and supplies the result of the estimation to the normalizing circuit 113. The normalizing circuit 113 normalizes the absolute value obtained in the absolute value calculation circuit 111 with the average power level of the received signals that is estimated by the power level estimation circuit 112 and supplies the result of the normalization to a step size determination circuit 120 for determining a filter coefficient updating amount. The step size determination circuit 120 determines a step size according to the result of normalization in the normalizing circuit 113 and supplies the result of the determination to the first and second adaptive filters 118 and 119.

The first adaptive filter 118 receives the received signal selected by the first selector 103 as an input and produces a first echo replica corresponding to echo contained in the first mixed signal 14 by using the filter coefficient set selected by the filter coefficient set selection circuit 104, the produced echo replica being supplied to a first subtracter 107. The first subtracter 107 subtracts the first echo replica as the output of the first adaptive filter 118 from the first mixed signal 14 and outputs the result as a first output signal 16. The first adaptive filter 118 updates the filter coefficient set selected by the filter coefficient set selection circuit 104 by using the step size determined by the step size determination circuit 120 such as to minimize the first output signal 16.

The second adaptive filter 119 likewise receives the received signal selected by the first selector 103 as an input and produces a second echo replica corresponding to echo contained in the second mixed signal 15 by using the filter coefficient set selected by the filter coefficient set selection circuit 104, the produced echo replica being supplied to a second subtracter 108. The second subtracter 108 subtracts the second echo replica as the output of the second adaptive filter 119 from the second mixed signal 15 and outputs the result as a second output signal 17. The second adaptive filter 119 updates the filter coefficient set selected by the filter coefficient set selection circuit 104 by using the step size determined by the step size determination circuit 120 such as to minimize the second output signal 17.

The step size determination circuit 120 increases the step size $\mu(n)$ when the normalized cross-correlation function value $C_{12}(n,m)$ is close to unity and reduces the step size $\mu(n)$ as the value is separated from unity. For example, the step size can be determined in relation to $$\mu(n) = e^{-\alpha(C_{12}(n,m)-1)^2} \quad (19)$$

where a is a positive constant or $$\mu(n) = \begin{cases} [bC_{12}(n,m) - 1]/(b - 1) & (1/b < C_{12}(n,m) \leq 1) \\ [2b - 1 - bC_{12}(n,m)]/(b - 1) & (1 < C_{12}(n,m) < 2 - 1/b) \\ 0 & \text{otherwise} \end{cases} \quad (20)$$

where $0 < b < 1$.

Figure 13:
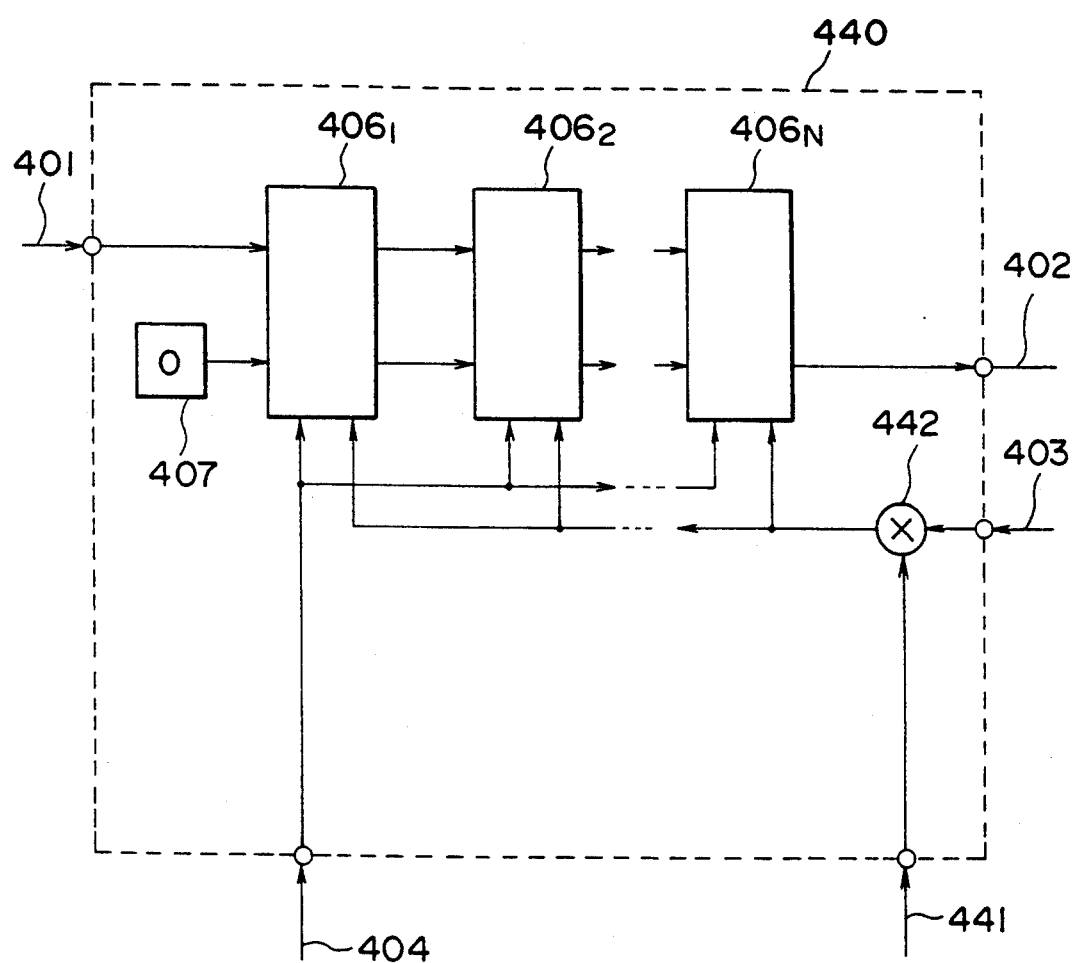
FIG. 13 is a block diagram showing an example of first and second adaptive filters in the third and fourth embodiments.

FIG. 13 is a block diagram showing an example of the construction of the first and second adaptive filters 118 and 119. This adaptive filter 440 receives the received signal 401 as the input and produces output signal 402 by using the set of filter coefficients designated by filter coefficient set selection signal 404. The set of filter coefficients designated by the filter coefficient set selection signal 404 is updated using step size 441 such as to reduce error signal 403. The operation and example of the adaptive filter will be described by assuming an N-tap transversal adaptive filter based on the LMS algorithm like in the adaptive filter of FIG. 6.

The adaptive filter input signal 401 is supplied as a delay line input to a first operational circuit $406_1$. The filter coefficient set selection signal 404 is supplied to N operational circuits $406_1, 406_2, \ldots, 406_N$. The first operational circuit $406_1$ executes a delaying operation, a convolution operation and a coefficient updating operation with input signal 401 to the adaptive filter 440 as a delay line input and constant 0 stored in a first constant register 407 as an adder input and supplies the delay line output as a delay line input to the second operational circuit $406_2$ and the adder output as an adder input to the second operational circuit $406_2$. The second operational circuit $406_2$ executes the delaying operation, convolution operation and coefficient updating operation with the first operational circuit delay line output as the delay line input and the first operational circuit adder output as the adder input and supplies the delay line output as a delay line input to the third operational circuit $406_3$ and the adder output as an adder input to the third operational circuit $406_3$. Likewise, the i-th operational circuit $406_i$ ($i=3, \ldots, N-1$) executes the delaying operation, convolution operation and coefficient updating operation with the $(i-1)$th operational circuit delay line output as the delay line input and the $(i-1)$-th operational circuit adder output as the adder input and supplies the delay output as the delay line input to the $(i+1)$-th operational circuit $406_{i+1}$ and the adder output as the adder input to the $(i+1)$-th operational circuit $406_{i+1}$. Similarly, the N-th operational circuit $406_N$ executes the delaying operation, convolution operation and coefficient updating operation with the $(N-1)$-th operational circuit delay line output as the delay input and the $(N-1)$-th operational circuit adder output as the adder input and outputs the adder output as the output signal of the adaptive filter 440. The delay line output of the N-th operational circuit $406_N$ is not used. A multiplier 442 obtains the product of step size 441 and error signal 403 and supplies the product as a coefficient updating amount to the operational circuits $406_1, 406_2, \ldots, 406_N$.

Figure 14:
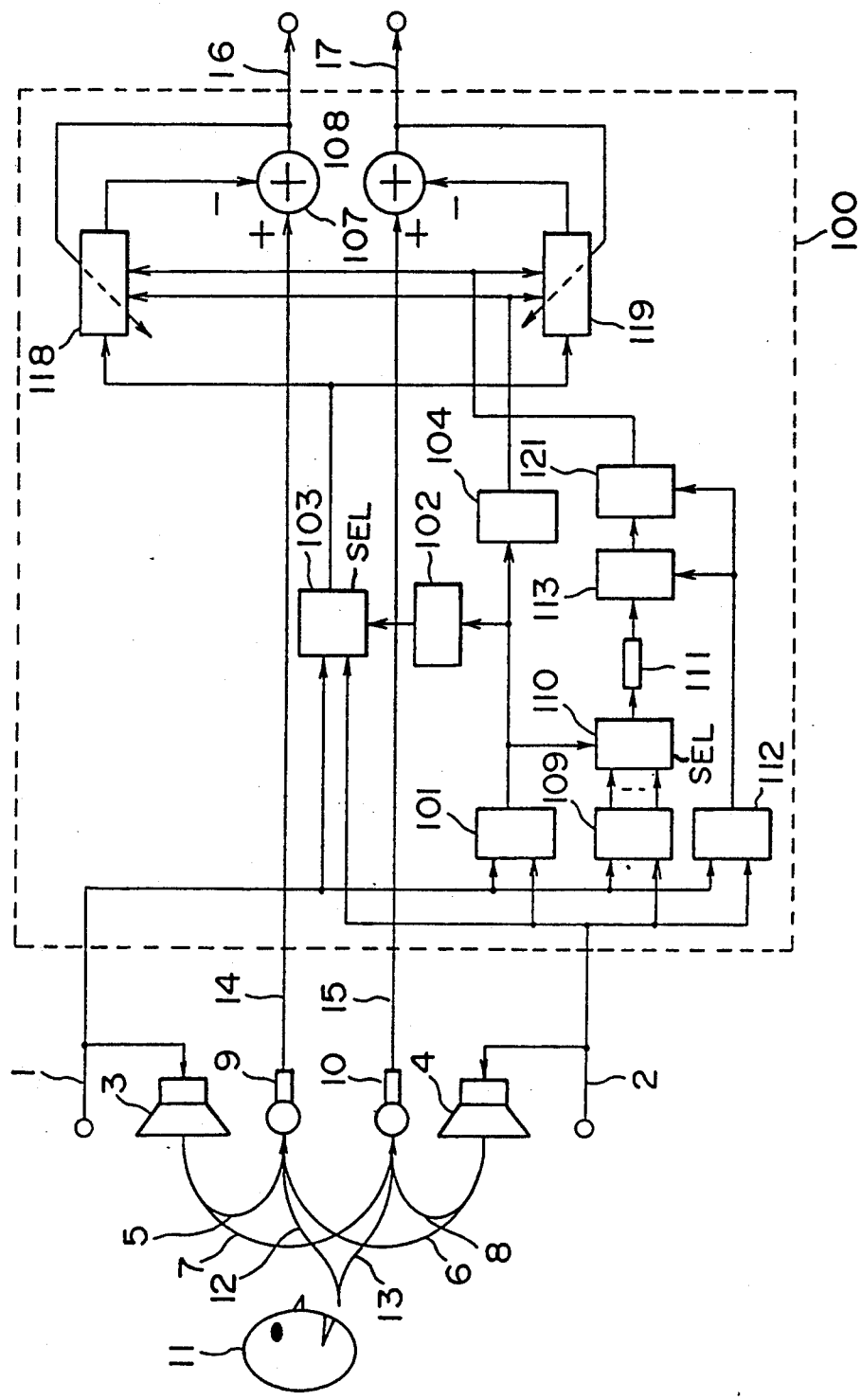
FIG. 14 is a block diagram showing a fourth embodiment of the multi-channel echo canceler according to the invention, in which received and transmitted signals are 2-channel signals.

FIG. 14 is a block diagram showing a fourth embodiment of the multi-channel echo canceler according to the invention, in which received and transmitted signals are 2-channel signals. A delay time difference estimation circuit 101 receives a first and a second received signal 1 and 2 as an input signal and estimates the delay time difference therebetween, the result of the estimation being supplied to a received signal selection circuit 102, a filter coefficient selection circuit 104 and a second selector 110. The received signal selection circuit 102 detects the shortest-delay-time received signal according to the result of estimation in the delay time difference estimation circuit 101 and supplies the result of the detection to a first selector 103. The first selector 103 selectively supplies the shorter-delay-time one of the received signals 1 and 2 to a first and a second adaptive filter 118 and 119 according to the result of detection in the received signal selection circuit 102. A filter coefficient set selection circuit 104 selects a set of filter coefficients to be used in the first and second adaptive filters 118 and 119 according to the result of estimation in the delay time difference estimation circuit 101 and supplies the result of selection to the first and second adaptive filters 118 and 119.

A cross-correlation function value estimation circuit 109 estimates cross-correlation function values between the two received signals 1 and 2 and supplies the result of the estimation to a second selector 110. The second selector 110 selects a value corresponding to the delay time difference between the two received signals 1 and 2 that is estimated by the delay time difference estimation circuit 101 among the cross-correlation function values estimated by the cross-correlation function value estimation circuit 109 and supplies the result to an absolute value calculation circuit 111. The absolute value calculation circuit 111 calculates the cross-correlation function value selected by the second selector 110 and supplies the calculated absolute value to a normalizing circuit 113. A power level estimation circuit 112 estimates the average power level of the two received signals 1 and 2 and supplies the result of estimation to the normalizing circuit 113 and a step size determination circuit 121. The normalizing circuit 113 normalizes the absolute value obtained in the absolute value calculation circuit 111 with the average power level of received signals that is estimated in the power level estimation circuit 112. The step size determination circuit 121 determines the step size according to the result of normalization in the normalizing circuit 113 and the result of estimation in the power level estimation circuit 112 and supplies the result of the determination to the first and second adaptive filters 118 and 119.

The first adaptive filter 118 receives the received signal selected by the first selector 103 as the input and produces a first echo replica corresponding to echo contained in a first mixed signal 14 by using the filter coefficient set selected by a filter coefficient set selection circuit 104, the produced echo replica being supplied to a first subtracter 107. The first subtracter 107 subtracts the first echo replica as the output of the first adaptive filter 118 from the first mixed signal 14 and outputs the result as a first output signal 16. The first adaptive filter 118 updates the set of filter coefficients selected by the filter coefficient set selection circuit 104 by using the step size determined by the step size determination circuit 121 so as to minimize the first output signal 16.

The second adaptive filter 119 likewise receives the received signal selected by the first selector 103 as the input and produces a second echo replica corresponding to echo contained in a second mixed signal 15 by using the filter coefficient set selected by the filter coefficient set selection circuit 104, the produced echo replica being supplied to a second subtracter 108. The second subtracter 108 subtracts the second echo replica as the output of the second adaptive filter 119 from the second mixed signal 15 and outputs the result as a second output signal 17. The second adaptive filter 119 updates the filter coefficient set selected by the filter coefficient selection circuit 104 by using the step size determined by the step size determination circuit 121 such as to minimize the second output signal 17.

The step size determination circuit 121 increases the step size $\mu(n)$ when the cross-correlation function value $C_{12}(n,m)$ is close to unity, while it reduces the step size $\mu(n)$ as the value is far from unity. Further, when the received signal power level $P(n)$ is low, the step size is reduced. For example, it is possible to determine the step size with such a function as:

$$\mu(n) = [e^{-a(C_{12}(n,m)-1)^2}]/[1+e^{-b(P(n)-P_0)}]$$

where a, b and $P_0$ are positive constants.

As has been described in the foregoing, with the above multi-channel echo canceler according to the invention it is possible to obtain highly accurate delay time difference estimation and also the quick detection of the movement or change of the talker. Also, right after the movement or change of the talker, the filter coefficient set updating is stopped, or the step size is updated. Thus, deterioration of the echo cancellation performance does not occur that might otherwise result from a delay of the detection of the movement or change of the talker or reduction of estimated delay time difference.

Figure 15:
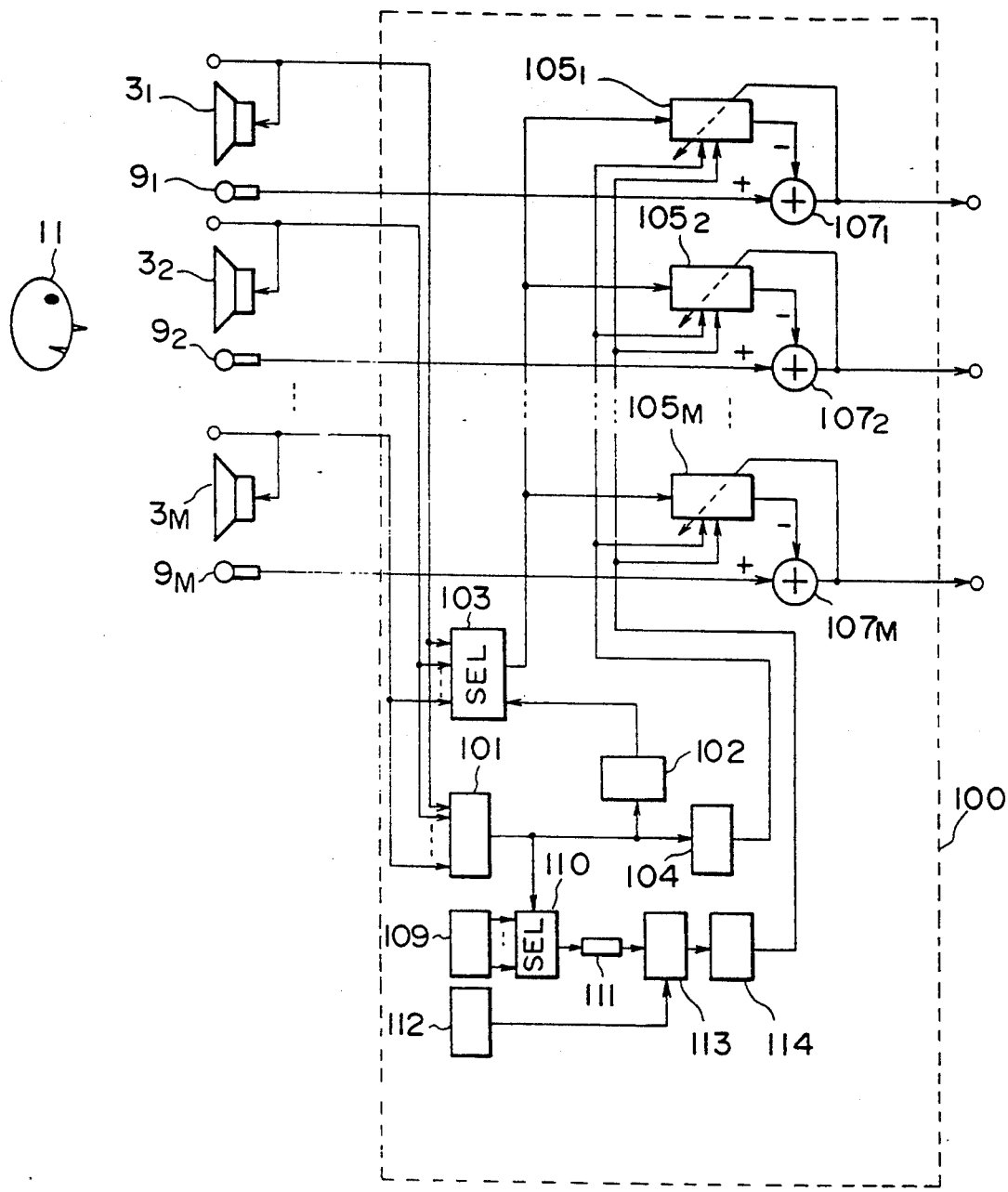
Figure 16:
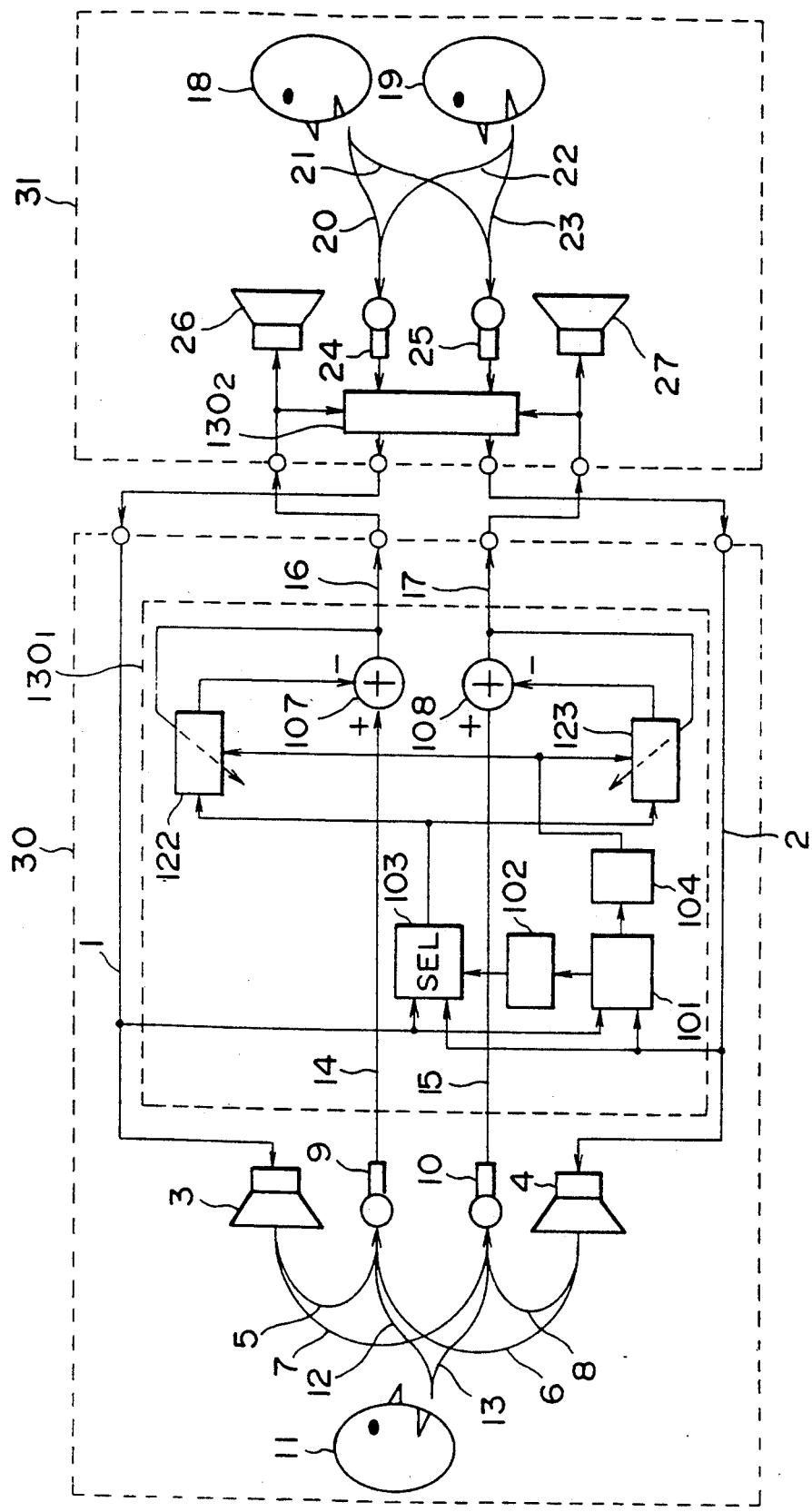
FIG. 16 is a block diagram showing a speech part of a conventional 2-channel television conference system.

FIG. 15 shows a block diagram of an embodiment of the multi-channel echo canceler according to the invention, in which M-channels received and transmitted signals are dealt with. In FIG. 15, like numerals have been used to designate the components similar to, or identical with, the components of the foregoing drawings and suffixes are attached with the components for each channel of 1, 2, ..., M.

Although the present invention has been described in relation to particular embodiments thereof, many other variations and modifications and other used will become apparent to those skilled in the art. It is preferred, therefore, that the present invention be limited not by the specific disclosure herein, but only by the appended claims.

What is claimed is:

1. In a conversation system including one or more speech sources, a plurality of loudspeakers and a plurality of microphones, a multi-channel echo canceler for canceling echoes generated as a result of propagation of plurality of received signals along a spatial acoustic path from said loudspeaker to said microphones from plurality of mixed signals in one-to-one correspondence to said microphones containing speech source signals and echoes inputted through said microphones, said multi-channel echo canceler comprising a delay time difference estimation circuit for receiving said plurality of received signals as input signals and estimating a set of a plurality of delay time differences corresponding to respective signal sets of each of two signals selected from said received signals, a received signal selection circuit for outputting a designation signal designating a shortest-delay-time one of said plurality of received signals, a first selector for selecting said shortest-delay-time one of said plurality of received signals according to said designation signal, a filter coefficient set selection circuit for selecting a set of filter coefficients among a plurality of preliminarily prepared sets of filter coefficients on the basis of a predetermined first algorithm according to the result of estimation in said delay time difference estimation circuit, a cross-correlation function value estimation circuit for estimating a plurality of cross-correlation values between two received signals among said plurality of received signals, a second selector for selecting, among said estimated cross-correlation function values, a cross-correlation function value corresponding to the delay time difference between said two received signals, an absolute value calculation circuit for calculating the absolute value of said selected cross-correlation function value, a power level estimation circuit for estimating the average power level of said two received signals, a normalization circuit for normalizing said absolute value of said selected cross-correlation function value with said estimated average power level of the received signals, a coefficient updating control circuit for outputting updating information about the updating of said selected set of filter coefficients according to the result of said normalization and said power level estimation, a plurality of adaptive filters in one-to-one correspondence to said mixed signals each for receiving said shortest-delay-time received signal selected by said first selector as the input and producing an echo replica corresponding to the echoes contained in said mixed signal and minimizing the difference between said mixed signal and said echo replica according to said updating information, a plurality of subtracters in one-to-one correspondence to said mixed signals each for outputting as output signal the result of subtraction of said echo replica corresponding to the echoes contained in the same mixed signal from said mixed signal.

2. The multi-channel echo canceler according to claim 1, wherein said coefficient set updating control circuit outputs one signal indicative of "updating" of said set of filter coefficients as said updating information if said normalization result is in a predetermined range, and outputs another signal indicative of "non-updating" of said set of filter coefficients as said updating information if said normalization result is not in said range, said adaptive filters each updates the set of filter coefficients selected by said filter coefficient set selection circuit such as to minimize the level of the corresponding output signal if said filter coefficient updating information is indicative of "updating".

3. The multi-channel echo canceler according to claim 1, wherein said coefficient set updating control circuit outputs one signal indicative of "updating" of said set of filter coefficients as said updating information if said normalization result is in a predetermined range and also if the estimated power level from said power level estimation circuit is higher than a predetermined threshold level, and outputs another signal indicative of "non-updating" of said set of filter coefficients as said updating information if said normalization result is not in the predetermined range or if the estimated power level is not higher than the predetermined threshold level, said adaptive filters each updates the set of filter coefficients selected by said filter coefficient set selection circuit such as to minimize the level of the corresponding output signal if said filter coefficient updating information is indicative of "updating".

4. The multi-channel echo canceler according to claim 1, wherein said coefficient set updating control circuit outputs a step size as said updating information indicative of the extent of one updating of the set of coefficients on the basis of a predetermined algorithm according to said normalization result, said adaptive filters each updates the set of filter coefficients selected by said filter coefficient set selection circuit according to the step size indicated by said updating information such as to minimize the level of the corresponding output signal.

5. The multi-channel echo canceler according to claim 1, wherein said coefficient set updating control circuit outputs a step size as said updating information indicative of the extent of one updating of the set of coefficients on the basis of a predetermined algorithm according to said normalization result from said normalization circuit and said estimated power level from said power level estimation circuit, said adaptive filters each updates the set of filter coefficients selected by said filter coefficient set selection circuit according to the step size indicated by said updating information such as to minimize the level of the corresponding output signal.

6. The multi-channel echo canceler according to claim 1, wherein said cross-correlation function value estimation circuit includes a first tapped delay line for delaying said first received signal, a second tapped delay line for delaying said second received signal, a first multiplier group consisting of a plurality of multipliers each for multiplying each tapped output of said first tapped delay line by said second received signal, a first integrator group consisting of a plurality of integrators in one-to-one correspondence to said multipliers in said first multiplier group and each for integrating the output of each said multiplier, a second multiplier group consisting of a plurality of multipliers each for multiplying each tapped output of said second tapped delay line by said first received signal, a second integrator group consisting of a plurality of integrators in one-to-one correspondence to said multipliers in said second multiplier group and each for integrating the output of each said multiplier, a first multiplier for multiplying said first and second received signals by each other, and a first integrator for integrating the output of said first multiplier.

7. The multi-channel echo canceler according to claim 6, wherein said integrator includes a tapped delay line for delaying the input signal to said integrator, a plurality of coefficient multipliers each for multiplying each tapped output of said tapped delay line by a constant, and an adder for obtaining the sum of the outputs of said coefficient multipliers and outputting the sum as result of integration.

8. The multi-channel echo canceler according to claim 6, wherein said integrator includes a first delay line for delaying the input signal to said integrator, a second delay line for storing the preceding output signal of said integrator by one sampling period, and an adder for outputting as said output signal obtained by subtracting the output of said first delay line from the sum of the output of said second delay line and said input signal, said output signal being stored in said second delay line.

9. The multi-channel echo canceler according to claim 6, wherein said integrator includes a first coefficient multiplier for multiplying the input signal to said multiplier by a constant, a tapped delay line for delaying the output signal of said integrator, a plurality of multipliers each for multiplying each tapped output of said tapped delay line by a constant, and an adder for obtaining the sum of the outputs of said coefficient multipliers and said first coefficient multiplier, the sum being made the output of said integrator and stored in said tapped delay line.

10. The multi-channel echo canceler according to claim 1, wherein said delay time difference estimation circuit includes a plurality of two-signal delay time difference estimation circuits for receiving said plurality of received signals as the inputs and estimating the delay time difference between two received signals among said plurality of received signals, a controller for receiving the results of said two-signal delay time difference estimation circuits and controlling said two-signal delay time difference estimation circuit so as to estimate all necessary two-signal delay time differences and outputting said two-signal delay time differences for receiving as input said first received signal and estimating said second received signal, a second transversal adaptive filter for receiving as input said second received signal and estimating said first received signal, a first absolute value calculation circuit group consisting of a plurality of absolute value calculation circuits each for obtaining the absolute value of a coefficient of said first adaptive filter, a second absolute value calculation circuit group consisting of a plurality of absolute value calculation circuits each for obtaining the absolute value of a coefficient of said second adaptive filter, and a judging circuit for estimating the delay time difference between said first and second received signals according to the output of each said absolute value calculation circuit in said first and second absolute value calculation circuit groups.

11. The multi-channel echo canceler according to claim 10, wherein said two-signal delay time difference estimation circuit includes a first selector for receiving said plurality of received signals as the input and selecting one of the two received signals designated by said controller as a first received signal, a second selector for receiving said plurality of received signals as the input and selecting other one of the two received signals designated by said controller as a first received signal, a first transversal filter for estimating the cross-correlation function values corresponding to a plurality of predetermined time differences between said first and second received signals, an absolute value calculation circuit group consisting of a plurality of absolute value calculation circuits for obtaining the absolute values of said cross-correlation function values corresponding to the plurality of time differences, and a judging circuit for the time difference corresponding to the maximum absolute value among the absolute values of said cross-correlation function values as an estimated time delay difference between said first and second received signals according to the output of each said absolute value calculation circuit in said absolute value calculation circuit group.

12. The multi-channel echo canceler according to claim 10, wherein said two-signal delay time difference estimation circuit includes a first selector for receiving said plurality of received signals as the input and selecting one of the two received signals designated by said controller as a first received signal, a second selector for receiving said plurality of received signals as the input and selecting other one of the two received signals designated by said controller as a second received signal, a cross-correlation function value estimation circuit for estimating the cross-correlation function values corresponding to a plurality of predetermined time differences between said first and second received signals, an absolute value calculation circuit group consisting of a plurality of absolute value calculation circuits for obtaining the absolute values of said cross-correlation function values corresponding to the plurality of time differences, and a judging circuit for the time difference corresponding to the maximum absolute value among the absolute values of said cross-correlation function values as an estimated time delay difference between said first and second received signals according to the output of each said absolute value calculation circuit in said absolute value calculation circuit group.

* * * * *